United States Patent [19]

Scroggie et al.

[11] Patent Number: 6,014,634
[45] Date of Patent: Jan. 11, 2000

[54] SYSTEM AND METHOD FOR PROVIDING SHOPPING AIDS AND INCENTIVES TO CUSTOMERS THROUGH A COMPUTER NETWORK

[75] Inventors: Michael C. Scroggie, Laguna Niguel; Michael E. Kacaba, Santa Monica, both of Calif.; David A. Rochon, Darien, Conn.; David M. Diamond, Pawling, N.Y.

[73] Assignee: Supermarkets Online, Inc., Greenwich, Conn.

[21] Appl. No.: 08/905,501

[22] Filed: Aug. 4, 1997

Related U.S. Application Data

[63] Continuation of application No. PCT/US96/20497, Dec. 23, 1996, abandoned
[60] Provisional application No. 60/009,244, Dec. 26, 1995.

[51] Int. Cl.[7] ........................................ G06F 17/60
[52] U.S. Cl. ........................ 705/14; 705/26; 705/27
[58] Field of Search .................................. 705/7, 10, 14, 705/26, 27; 395/200.47, 200.48, 200.49, 200.68; 348/12, 14

[56] References Cited

U.S. PATENT DOCUMENTS

| | | |
|---|---|---|
| 3,426,326 | 2/1969 | Goldstein . |
| 3,737,631 | 6/1973 | Harris . |
| 3,770,941 | 11/1973 | Gechele et al. . |
| 3,771,132 | 11/1973 | Biewer . |
| 3,899,775 | 8/1975 | Larsen . |
| 4,002,886 | 1/1977 | Sundelin . |
| 4,554,446 | 11/1985 | Murphy et al. . |
| 4,787,037 | 11/1988 | Ootsuka . |
| 4,843,546 | 6/1989 | Yoshida et al. . |
| 4,882,675 | 11/1989 | Nichtberger et al. . |
| 4,887,208 | 12/1989 | Schneider et al. . |
| 4,949,256 | 8/1990 | Humble . |
| 4,972,504 | 11/1990 | Daniel, Jr. et al. . |
| 5,056,019 | 10/1991 | Schultz et al. . |
| 5,060,185 | 10/1991 | Naito et al. . |
| 5,119,294 | 6/1992 | Tanaka . |
| 5,128,861 | 7/1992 | Kagami et al. . |
| 5,168,445 | 12/1992 | Kawashima et al. . |
| 5,237,496 | 8/1993 | Kagami et al. . |
| 5,245,533 | 9/1993 | Marshall . |
| 5,249,044 | 9/1993 | Von Kohorn .............................. 348/12 |
| 5,256,863 | 10/1993 | Ferguson et al. . |
| 5,285,278 | 2/1994 | Holman . |
| 5,287,181 | 2/1994 | Holman . |
| 5,305,199 | 4/1994 | Lobiondo et al. . |
| 5,315,093 | 5/1994 | Stewart . |
| 5,331,544 | 7/1994 | Lu et al. . |
| 5,337,253 | 8/1994 | Berkovsky et al. . |
| 5,347,632 | 9/1994 | Filepp et al. . |
| 5,353,218 | 10/1994 | De Lapa et al. . |
| 5,367,452 | 11/1994 | Gallery et al. . |
| 5,377,095 | 12/1994 | Maeda et al. . |
| 5,380,991 | 1/1995 | Valencia et al. . |
| 5,396,417 | 3/1995 | Burks et al. . |
| 5,401,946 | 3/1995 | Weinblatt . |
| 5,406,475 | 4/1995 | Kouchi et al. . |
| 5,459,306 | 10/1995 | Stein et al. .............................. 235/383 |
| 5,483,049 | 1/1996 | Schulze, Jr. . |
| 5,687,322 | 11/1997 | Deaton et al. . |
| 5,710,886 | 1/1998 | Christensen et al. ..................... 705/14 |
| 5,761,648 | 6/1998 | Golden et al. . |
| 5,822,735 | 10/1998 | De Lapa et al. . |
| 5,848,396 | 12/1998 | Gerace . |

FOREIGN PATENT DOCUMENTS

| | | |
|---|---|---|
| 0 512 509 A2 | 11/1992 | European Pat. Off. . |
| 0512509 | 5/1992 | France ........................................... 9/2 |
| WO 93/15466 | 8/1993 | WIPO . |
| WO 95/16971 | 6/1995 | WIPO . |
| WO 97/23838 | 7/1997 | WIPO . |

OTHER PUBLICATIONS

SLED "Internet Directory Distribution Electronic Coupons" Newswire May 1994.

PNC, "Business Editors/Banking & Finance Writers", Jun. 1996.

Fontana, John, "Internet/Intranet—Web Servers, Browsers< Tools & Online Services"Nov. 1996.

"Electronic Coupon Program Offers Data Base Potential" by Kelly Shermach, Marketing News, Sep. 25, 1995 (3 pages).

In this Computer Age, Who Needs Coupons?, The New York Times, Jun. 15, 1989.[1].

Interactive Cable System Receives Strong Response, Direct Marketing, pp. 9–10, Dec. 1992.

SLED Internet Directory Distributes Electronic Coupons, PR Newswire, May 9, 1994.

PNC Bank Announced Internet Site, Plans Comprehensive Service Expansion, Business Wire, Jun. 13, 1996.

Article. by Carlene A. Thissen. Clearing Up Questions in Coupon Clearing. (source and date unknown).

2nd Net Bank Opens for Business, John Fontana, Communicationsweek, p. 46, Nov. 4, 1996.

IntelliQuest and Coolsavings Offer Innovative Online Customer Relationship Management Program for Technology Vendors, Business Wire, Sep. 30, 1998.

IntelliQuest Looks for Interaction with Loyalty, Web Traffics Programs, Electronic Advertising & Marketplace Report, Oct. 20, 1998.

Catalina Marketing Corporation News Letter: Catalina Marketing Online Launch to Include More than 1.600 California Stores, Feb. 11, 1996.

Catalina Marketing Corporation News Letter: San Jose Consumers Can Now Plan Supermarket Shopping in Cyberspace—New Internet Service Saves Shoppers Time and Money—Apr. 19, 1996.

SuperMarkets Online: Internet Coupon Security Breakthrough Removes Major Obstacle to On–line Packaged Goods Advertising Aug. 5, 1997.

SuperMarkets Online: Internet and Food Industries Embrace Secure Online Coupon Format, Dec. 1, 1997.

*Primary Examiner*—Allen R. McDonald
*Assistant Examiner*—Hani M. Kazimi
*Attorney, Agent, or Firm*—Oblon, Spivak, McClelland, Maier & Neustadt, P. C.

[57] ABSTRACT

A system and method for delivering purchasing incentives and a variety of other retail shopping aids through a computer network, such as by E-mail over the Internet or the World Wide Web. Customers (10) of retail stores can establish a bidirectional communication link with the system, log in (16) to the system, and then elect to browse among available purchasing incentive offers (18, 22), or elect to explore other shopping aids, such as a shopping list generator (26), a recipe center (30), or simply elect to claim a product rebate or to receive product information. If the customer elects to have product information or rebate information delivered, only minimal customer identification is required. For purchase incentives redeemable at retail stores, the customer must provide identification information and must also designate a retailer (12) at which the purchasing incentive can be exercised. For receipt of focused incentives based the customer's past shopping behavior, the customer must also supply a unique customer id., such as a check cashing card number or credit card number, used for in-store purchases. For delivery of a product sample, the customer's name and address must be supplied. The system merges this customer-supplied information (270) with other purchase incentive data (272) and creates a printable graphical image of the purchasing incentive (282) for transmission to the customer. In an alternate embodiment of the invention, the purchase incentive is not transmitted directly to the customer. Instead, the terms of the incentive are transmitted electronically to the retail store (310) designated by the customer, who receives either a token (316) to present at the store or an advisory message. In yet another embodiment of the invention, incentives may be targeted to specific consumers based on a consumer purchase history (502), and transmitted to consumers' computers (510) using electronic mail addresses stored in a consumer database (506), or using a "personal page" in the computer network, established for each consenting consumer.

41 Claims, 18 Drawing Sheets

LEGEND:

A. CONSUMER'S NAME
B. COUPON EXPIRATION DATE
C. SYSTEM ADMINISTRATOR'S LOGO ICON
D. PRODUCT OFFER ICON
E. AMOUNT OF SAVINGS
F. TERMS FOR RECEIVING SAVINGS AMOUNT
G. LEGAL TEXT
H. REDEMPTION TEXT
I. COUPON SEQUENCE NUMBER
J. BAR COUPON NUMBERS:
   - UPC TYPE 5 CODE
   - EAN TYPE 128 CODE
K. SUPERMARKET DESIGNATION
L. COMPLEX BACKGROUND PATTERN

SYSTEM AND METHOD FOR PROVIDING SHOPPING AIDS AND INCENTIVES TO CUSTOMERS THROUGH A COMPUTER NETWORK

CROSS REFERENCE TO RELATED APPLICATIONS

The present application is a continuation of and claims the right of priority to International Application PCT/US96/20497, filed on Dec. 23, 1996, now abandoned only as to the United States of America.

The present application is related to U.S. application Ser. No. 08/622,685, filed Mar. 26, 1996, and U.S. Provisional Application Serial No. 60/009,244, filed Dec. 26, 1995.

BACKGROUND OF THE INVENTION

This invention relates generally to systems for providing incentives to customers to shop in retail stores and, more particularly, to systems for delivering customer incentives and other shopping aids via a computer network. Various approaches have been widely used to deliver purchasing incentives, usually in the form of printed discount coupons, to customers of retail stores. Coupons have been distributed to customers by mail, either in a random manner or in a more demographically focused manner. Coupons have also been delivered to customers in retail stores, either from kiosks or at the check-out stand in response to the customer's purchase of some preselected item or items. The latter technique is well documented in prior patents assigned to the same assignee as the present application; e.g., U.S. Pat. No. 4,723,212, "Method and Apparatus for Dispensing Discount Coupons."

In recent years, an increasing number of retail store customers also own personal computers and, of these, many have access to computer network services that provide connections to the Internet and the World Wide Web. Although some computer sites connected to the World Wide Web have begun to offer "online" shopping services, and some services have proposed to deliver discount coupons through a computer network, the full potential of online delivery of incentives has not been realized prior to the present invention.

SUMMARY OF THE INVENTION

The present invention resides in a system and method for the distribution, via a computer network, of incentives and other related shopping aids useful to retail customers. Importantly, the incentives are distributed in such a way that they may be redeemed only at a specific retailer selected by each customer.

Briefly, and in general terms, the method of the invention comprises a sequence of steps performed at a central site in cooperation with a communication device at a customer site. The steps include logging in a remotely located customer using identity data and geographic region data transmitted by the customer over a communication network; transmitting back to the registered customer a plurality of incentive offers, the incentive offers being exercisable in the customer's geographic region; and then receiving incentive offer selection data from the customer over the communication network, the offer selection data including the designation of a retailer at which selected offer or offers may be exercised. In response to the customer selection data, the method performs the steps of generating a purchasing incentive containing (in encoded form) the identity of the retailer designated by the customer and the identity of the customer; and transmitting at least one incentive to the customer over the communication network, for subsequent printing by the customer. For security reasons, the transmitted incentive may be encoded with the identity of the retailer selected by the customer, and preferably also contains a customer identification code.

An important element of the invention is that it permits the customer to plan his or her shopping and shopping-related activities more efficiently. To this end, the method also includes the step of communicating with the customer concerning the use of shopping aids other than incentives or coupons. In one aspect of the invention, this communicating step includes transmitting a list of products available for purchase, receiving customer selections from the list of products, and then transmitting a shopping list to the customer. Thus the customer may browse through a list or index of available products, preferably organized by store department, and then make selections by marking appropriate entries on a computer screen, such as by positioning a mouse pointer on the desired items and clicking a mouse button.

Another aspect of the invention includes the steps of transmitting meal planning information, including a list of recipes, to the customer, receiving a customer selection of one or more recipe, transmitting back to the customer a shopping list that includes ingredient products needed in each selected recipe, and possibly transmitting to the customer at least one purchase incentive pertaining to an ingredient product used in a selected recipe. While shopping for products with purchasing incentive offers, or while preparing a shopping list, the customer may also use this feature to obtain the details of any recipe that is found to be of interest. The system of the invention transmits the recipe in two separate portions: (a) a complete copy of the recipe in traditional format, including a list of ingredients, and preparation and serving instructions, and (b) the list of ingredients in shopping list form, which the customer may take to the store. The latter portion of the recipe is added to the customer's shopping list automatically and the system transmits a purchase incentive or coupon if an incentive offer is associated with any of the recipe ingredients. The system also provides other meal planning information such as meal calorie and fat content, vegetarian meal ideas and recipes, recipes for meals that can be prepared in under thirty minutes, and so forth.

The purchasing incentive offers in the presently preferred embodiment of the invention are derived from two sources: product manufacturers and retailers. The manufacturers' incentives are presented to the customer in the form of a convenient index that the customer can browse through and select from. Similarly, retail supermarkets provide the source of another set of special offers, organized by store.

Another important aspect of the invention is the manner in which incentives or coupons are generated in the system of the invention. Specifically the step of generating a purchase incentive includes converting numeric and textual information provided by the customer to graphical form; converting other numeric and textual information to graphical form; and merging the converted information with other graphical information defining the incentive, to form a composite graphical incentive image for transmission to the customer.

In one embodiment of the invention the step of transmitting at least one incentive includes transmitting only an advisory message to the customer, and transmitting the terms of the incentive directly to the retail store selected by the customer, for use by the customer on a subsequent visit to the store. In a related embodiment, the step of transmitting at least one incentive includes transmitting only an incentive token to the customer, and transmitting the terms of the incentive directly to the retail store selected by the customer, for use by the customer, who brings the token to the store on a subsequent visit, and receives the discount or other benefit defined by the incentive offer.

The invention may also be defined in terms of a method for distributing purchasing incentives and other shopping aids to customers over a communication network, the method comprising the steps of: (1) registering as a customer by providing at least an individual identification, a postal region code, and retail store selection; (2) transmitting from a central site and receiving at a remote customer site, a plurality of incentive offers, each of which is exercisable based on the customer's postal region; (3) selecting at the customer site one or more of the incentive offers and transmitting these selections back to the central site; (4) generating at least one purchasing incentive containing in encoded form the identity of the retail store selected by the customer and the identity of the customer; and (5) transmitting at least one incentive to the customer.

The invention may also be defined in terms of a system for distributing purchasing incentives to retail customers, the system comprising a communication network establishing bidirectional communication between a central site and each of a plurality of customer devices; a file at the central site containing a plurality of incentive offers; and a computer located at the central site, for coordinating bidirectional communication with the customers over the communication network. The computer at the central site includes means for registering customer information at the central site, based on information transmitted from any of the customer devices to the central site computer, over the communication network, the customer information including geographical region data and identification data; means for retrieving incentive offers from the file of incentive offers, based on the customer's geographical region, and transmitting the retrieved offers to the customer over the communication network; means for receiving customer selections made from the incentive offers transmitted to the customer, and for receiving a customer designation of a retailer at which the selected incentives are to be exercised; means for generating at least one purchasing incentive containing in encoded form the identity of the retailer designated by the customer and the identity of the customer; and means for transmitting the generated purchasing incentive to the customer over the communication network.

More specifically, the system further comprises another file at the central site containing a list of products available for purchase; and the computer at the central site further includes means, responsive to a customer request, for transmitting the list of products to the customer, receiving customer selections from the list, and transmitting a shopping list back to the customer. The system may further comprise another file at the central site containing meal planning information available for customer use; and the computer at the central site further includes means, responsive to a customer request, for transmitting meal planning information including a list of recipes to the customer, receiving customer selections from the list, and transmitting complete recipes back to the customer, together with an ingredients shopping list and any associated purchasing incentives.

In the disclosed embodiment of the invention, the means for retrieving incentive offers and transmitting them to the customer includes a manufacturer offer file containing purchasing incentive offers currently proposed by manufacturers of products for sale to customers, and also includes a retailer offer file containing purchasing incentive offers currently proposed by retailers of products for sale to customers.

In one form of the invention, the generated purchasing incentive is transmitted to the customer in the form of an advisory message only, and the computer further includes means for transmitting the terms of a purchasing incentive directly to the retail store designated by the customer, who may then exercise the incentive upon visiting the designated store. In a related form of the invention, the generated purchasing incentive is transmitted to the customer in the form of an encoded token, and the computer further includes means for transmitting the terms of the purchasing incentive directly to the retail store designated by the customer, who may then exercise the incentive upon visiting the designated store and presenting the token.

Implementation of the invention in the form of a network site, such as a World Wide Web site, represents a significant departure from prior, conventional uses of Web sites for commercial purposes. Instead of being administered by or for a single commercial entity, the Web site through which customers communicate in accordance with the present invention is a cooperative site involving both retailers and manufacturers, to provide customers with a variety of information, planning aids, and shopping incentives from multiple sources.

A difficulty with conventional incentive distribution methods is that different retail marketing areas have different weekly cycles on which incentives and discounts are based. In one area, retailers may advertise weekly specials beginning on Thursdays in preparation for weekend buying, while in another area they may advertise weekly specials in a Sunday newspaper supplement. Manufacturers may offer special deals that are completely unsynchronized with these local retailer cycles, based, for example, on a calendar week starting on some other day. In the cooperative site on which the present invention is implemented, all the advertised incentives, whether coming from retailers or manufacturers, can be timed to comply with the advertising cycle of the local retail region.

Another aspect of the invention allows the customer to receive more focused incentives if he or she elects to supply a customer identifying number (customer id.) normally used in the purchase of items at the retail store. The customer id. may be a check-cashing card number or other customer loyalty card number, or may be some other form of identification used to pay for purchases. Because the store can track the purchasing history of each customer who consistently uses the same customer id. when paying for the purchases, a customer who supplies this customer id. to the on-line system of the present invention may then receive more targeted incentives based on his or her prior purchasing history. For example, the customer may receive an incentive for his or her favorite brand of toothpaste, based on a prior purchase of the same toothpaste some weeks earlier. If the customer elects not to provide the customer id. to the on-line system, these more targeted incentives will not be available to that customer.

It will be appreciated from the foregoing summary that the present invention represents a significant advance in the field of retail marketing using computer networks. In particular, the system of the invention provides a highly secure incentive distribution scheme because each incentive or coupon may identify the retailer at which the coupon may be used, and also preferably identifies the customer to whom the coupon was issued. The invention also provides a variety of other planning aids to customers using computers before visiting a supermarket. These aids include the generation of a shopping list for the customer, the distribution of selected recipes, together with ingredients lists and incentives, if any are available for the ingredients, and the distribution of product information or rebate forms. Other aspects and advantages of the invention will become apparent from the following more detailed description, taken in conjunction with the accompanying drawings.

DESCRIPTION OF THE PREFERRED EMBODIMENT

Figure 1:
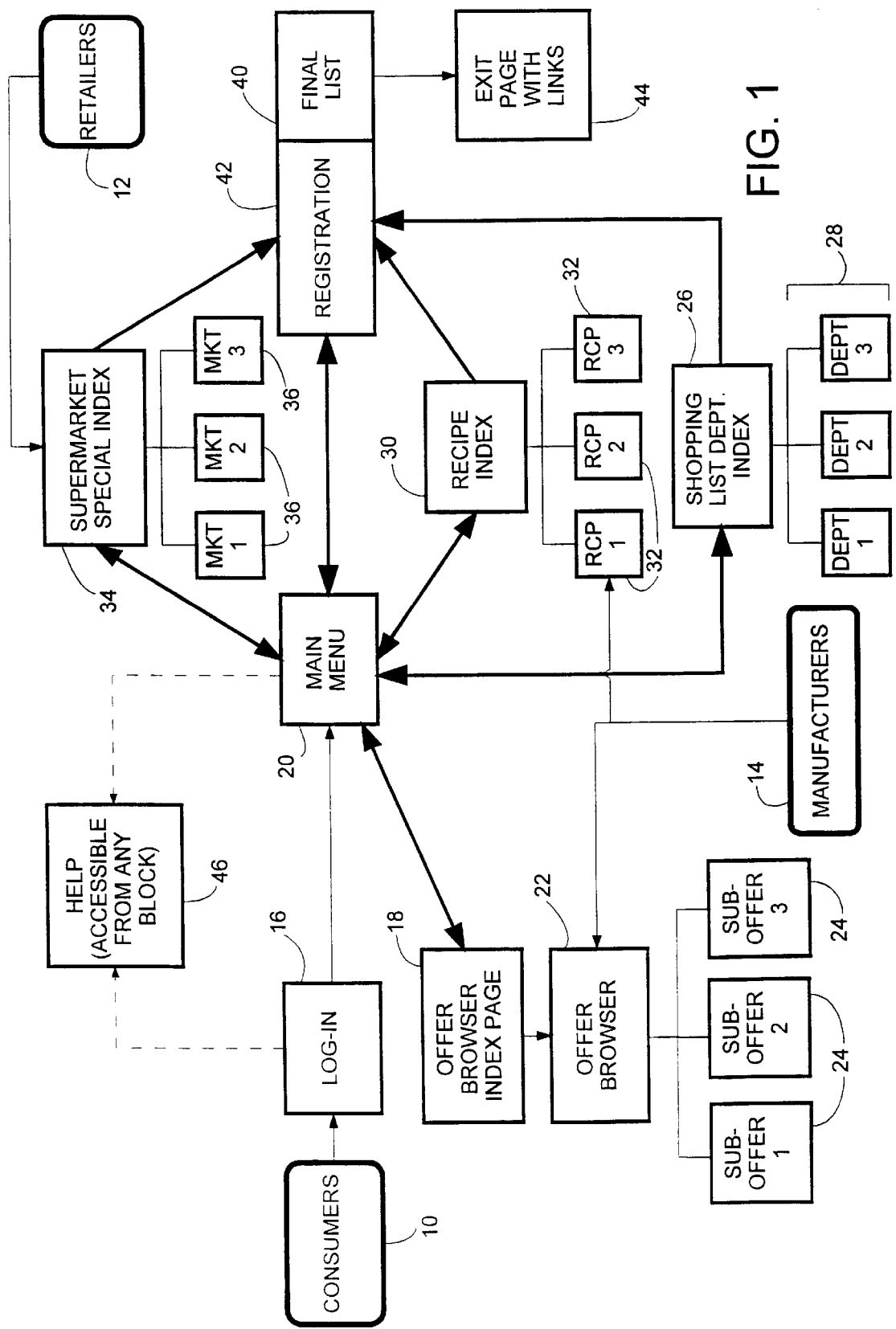
FIG. 1 is a an overall process flow diagram of the system of the invention.

As shown in the drawings for purposes of illustration, the present invention pertains to a system for the distribution of shopper incentives and related shopping aids by means of a computer network to which customers have access at remote locations, such as in their homes.

Overview:

FIG. 1 provides an overview flow diagram of the system of the invention. The system provides a unique communication network connecting consumers, indicated at block 10, retailers 12 and manufacturers 14. The consumers 10 log in and fulfill log-in requirements as indicated in block 16, and may then proceed to a main menu 20. From the main menu 20, a consumer may elect to go to an offer browser index page 18, which is linked to an offer browser 22. The offer browser 22 has associated sub-offers 24 available for consumer selection. Basically, the offer browser 22 receives offer data from the manufacturers 14 on a periodic basis, and displays the offers to consumers 10 who have logged in to the system. The offer and sub-offer structure permits consumers to select coupon offers, rebate offers, or information offers made available by the manufacturers. Selected offers are accumulated in a session record maintained for the time that each consumer is logged in to the system.

From the main menu 20, a consumer may also elect to go to a shopping list 26, under which store departments 28 provide lists of products for sale. The consumer may mark any items for entry on a shopping list to be printed later. The consumer may also elect to go from the main menu to a recipe index 30, which provides a linkage to previously stored recipes 32. In response to consumer selection of a recipe 32, the ingredients are automatically entered into the consumer's final shopping list, and any coupon offers or rebate offers associated with any of the ingredients are also automatically included in the final list to be transmitted to the consumer. A consumer may also elect to go from the main menu 20 to a supermarket special index 34, which has linkages to previously stored supermarket special offers 36. These have been entered and periodically updated by the retailers 12. Again, any selected items are automatically entered into the consumer's final shopping list.

When the consumer has finished selecting from the offer browser 22, the shopping list index 26, the recipe index 30 and the supermarket special index 34, he or she may elect to go the final list 40. Prior to generation of the final list, the consumer will be required to enter a valid Internet address for electronic mail (E-mail), and to select a supermarket in his or her area, as indicated in block 42. Once the final list has been generated, the consumer may elect to leave the system through an exit page 44, which may have links to other areas of the system. As also shown in FIG. 1, the consumer may also elect to go to a help page 46, which is accessible from any of the other principal blocks shown in the overview, as indicated by the connections to the main menu 20 and the log-in block 16. The functions described briefly in this overview should become clearer as each is discussed below in more detail.

Figure 2:
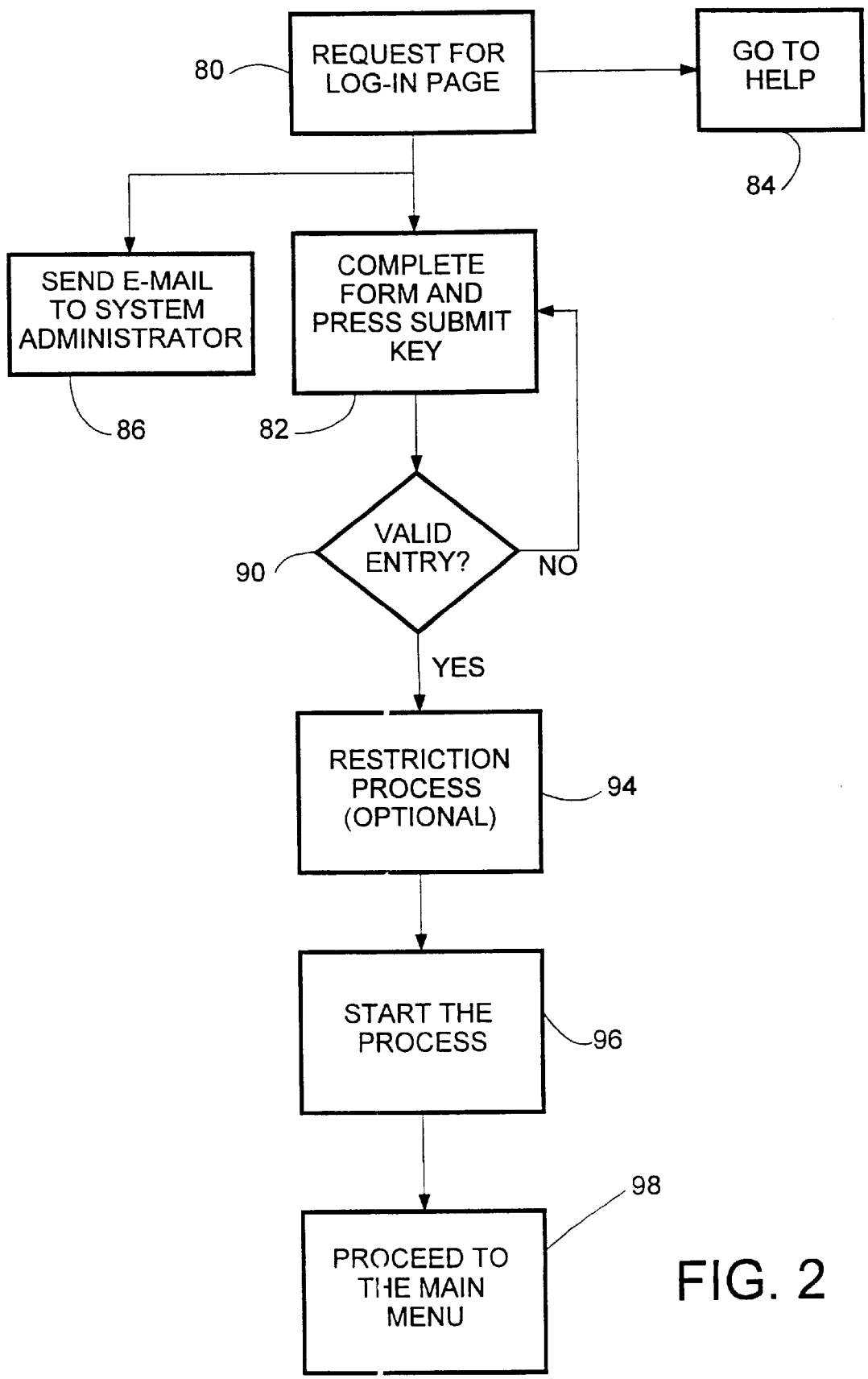
FIG. 2 is a flow diagram of the log-in process used by a customer in accordance with the invention.

The Log-in Page:

On first accessing the system of the invention, the consumer encounters the Log-in page, which provides a starting point for each online session. The Log-in page contains a log-in process, as indicated in the flowchart of FIG. 2. A log-in page is presented to the consumer, as indicated in block 80, and the consumer completes an on-screen form and presses (clicks on) a "submit" key, as indicated in block 82. There may be other on-screen buttons available to the user, such as a "help" button 84 and a button 86 to select that E-Mail be sent to the system administrator. At Log-in time, the user is required to enter his or her ZIP code or other postal code, since many of the features of the system are location-dependent. If the postal code entry is determined to be invalid, in block 90, a rejection message is posted on the user's screen, as indicated at 92. If the entry is valid, a restriction process 94 may be performed, then the session is started, as indicated at 96, and the system proceeds to present the main menu to the user, as indicated in block 98.

Figure 3:
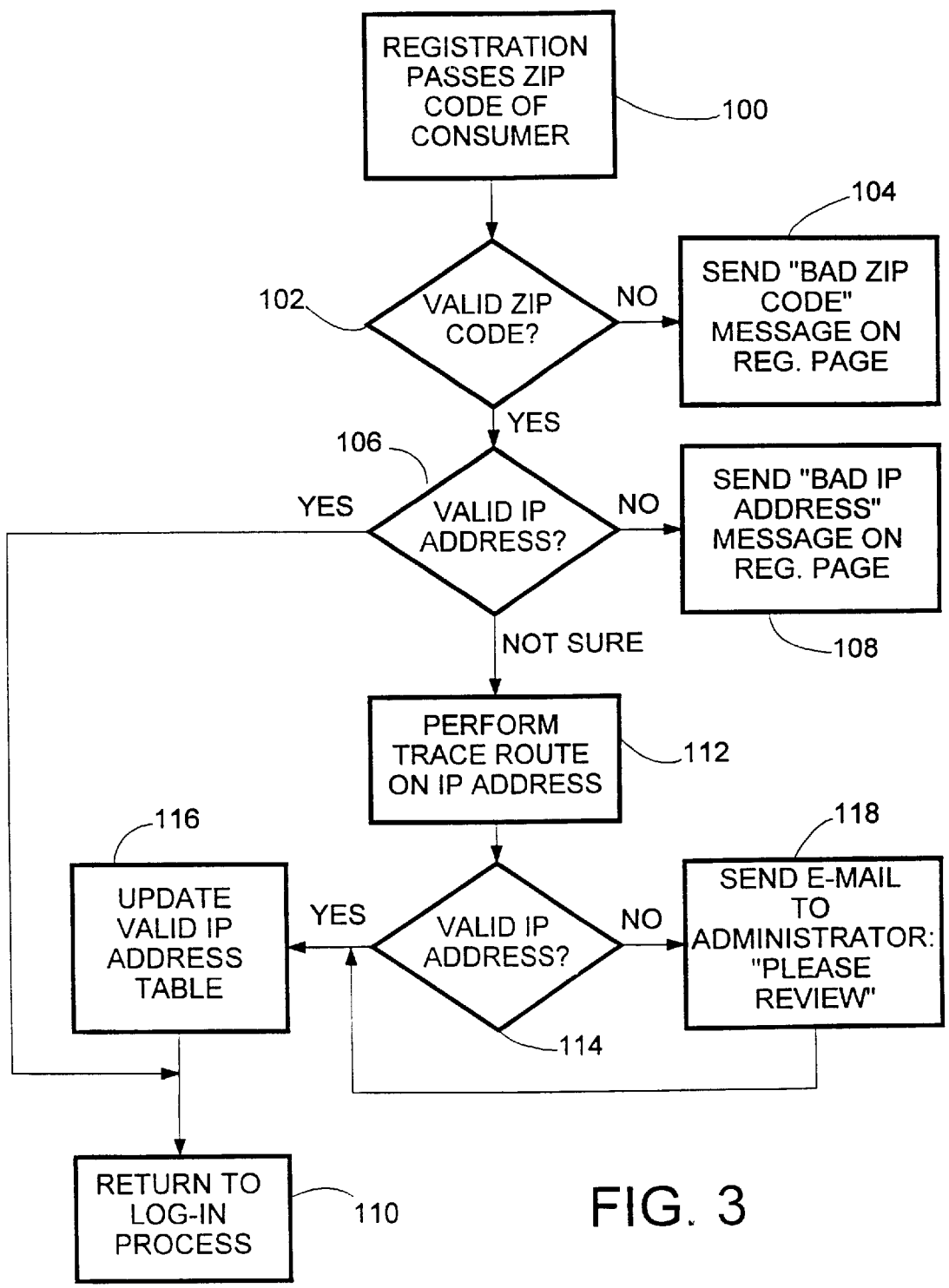
FIG. 3 is a flow diagram of a restriction process used to restrict access to only authorized customers in a selected geographic region.

The restriction process 94 is shown in more detail in FIG. 3. The ZIP or postal code is passed to the process from a calling program, such as the Log-in program, as indicated in block 100. Then the ZIP or postal code is checked for validity, in block 102. Initially, the system may not be in operation in all postal codes, and this validity check restricts access to those consumers with appropriate postal codes. Moreover, not all ZIP or postal codes are necessarily valid or in use. In addition, the ZIP code determines what offers are transmitted to consumers, based on the market areas they reside in. If the postal code is invalid, a rejection message is transmitted to the user, as indicated in block 104.

Optionally, the restriction process also checks the Internet address of the user, referred to as the Internet Protocol (or IP) address, as indicated in block 106. If the IP address is not acceptable, a rejection notice is transmitted to the user, as indicated in block 108. If the IP address is found to be valid, return is made to the calling Log-in program to complete the restriction process, as indicated at 110. Another possibility occurs when there is some doubt, but not certainty, concerning the user's IP address. A trace route is optionally performed on the user's IP address, as indicated in block 112, and the validity is checked once more, as indicated in block 114. If the IP address is this time found to be valid, an IP address table of valid addresses is updated, as shown in block 116, before exiting the process. If the block 114 finds the IP address still invalid, an advisory message is sent to the system administrator, as indicated in block 118, before updating the valid IP address table and exiting the process.

A "help" page is accessible from the Log-in page and from other pages in the system. Its purpose is provide a high-level flowchart to the user, together with associated narrative information, to explain the major functions of the system and how they interrelate in a single session. The "help" page also provides the benefits of the system and functions as an enticement for the user to register.

Figure 4:
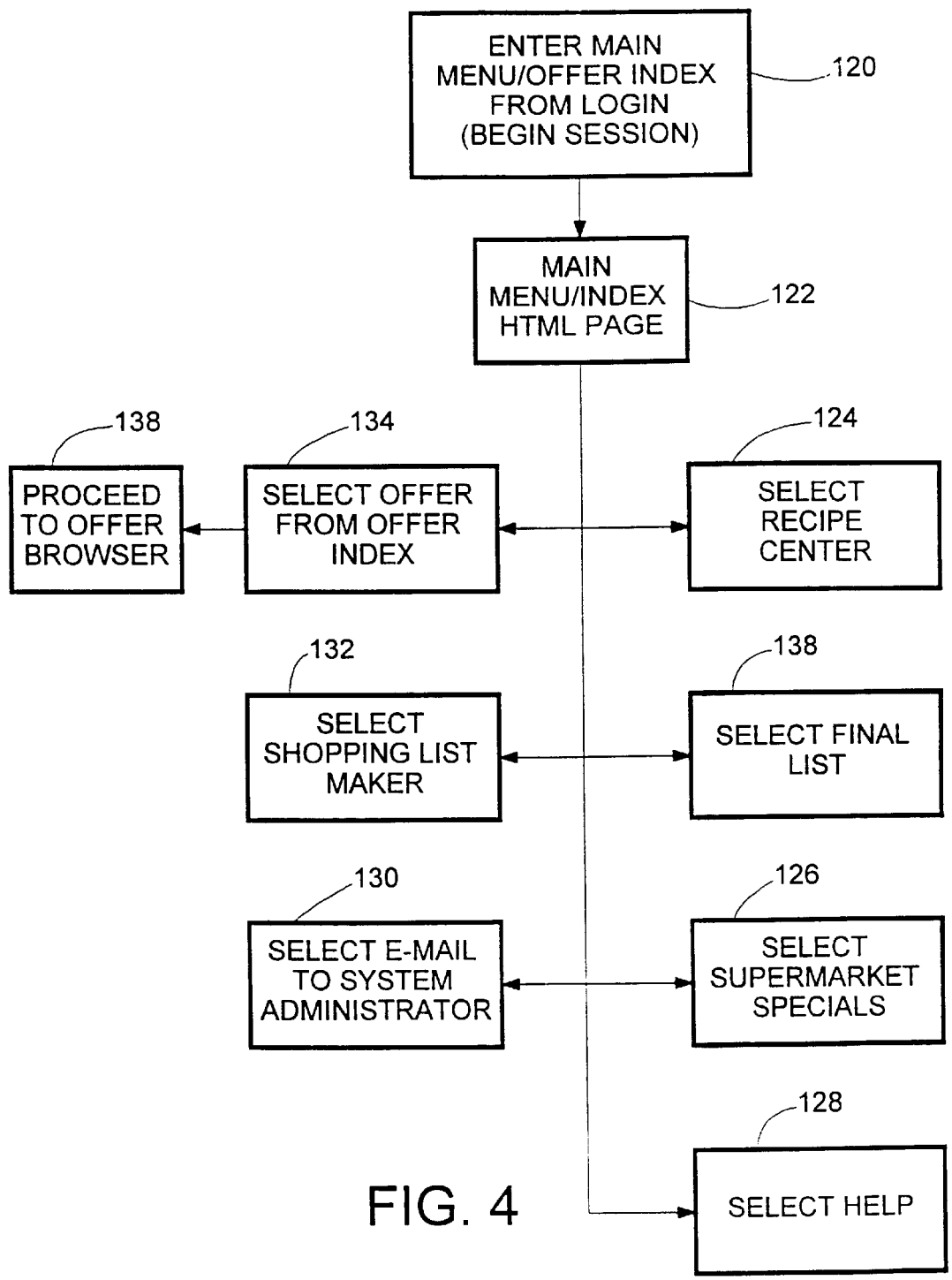
FIG. 4 is a flow diagram of the main menu process of the system of the invention.

The Main Menu:

As one might expect, the main menu provides the user with a central page from which all the major functions of the system can be reached. As shown in FIG. 4, the main menu is entered from the Log-in page, indicated at block 120, and provides a main menu and offer index, as indicated in block 122. The main menu screen gives the user at least eight different functions that are selected by pointing and clicking on an appropriate button or icon. The functions include:

Select the recipe center (block 124),
Select supermarket specials (block 126),
Select help (block 128),
Select E-Mail to the system administrator (block 130),
Select the shopping list maker (block 132),
Select an offer from an index of offers (block 134),
Select going to an offer browser (block 136), and
Select final list processing (block 138).

The final list is a composite of all prior activities of the user during the current online session. In the offer browser, the user may select an offer from a matrix of offers (the offer index), and the selected offer is then added to the final list for this session. In the shopping list maker, the user selects specific items that he or she intends to purchase during the next store visit. These items are added to the final list. The recipe center allows the user to select one or more recipes from an offered list. The ingredients needed in the recipes are also added to the final list. The supermarket specials button allows the user to choose any of a number of advertised specials and add these to the final list.

Figure 5:
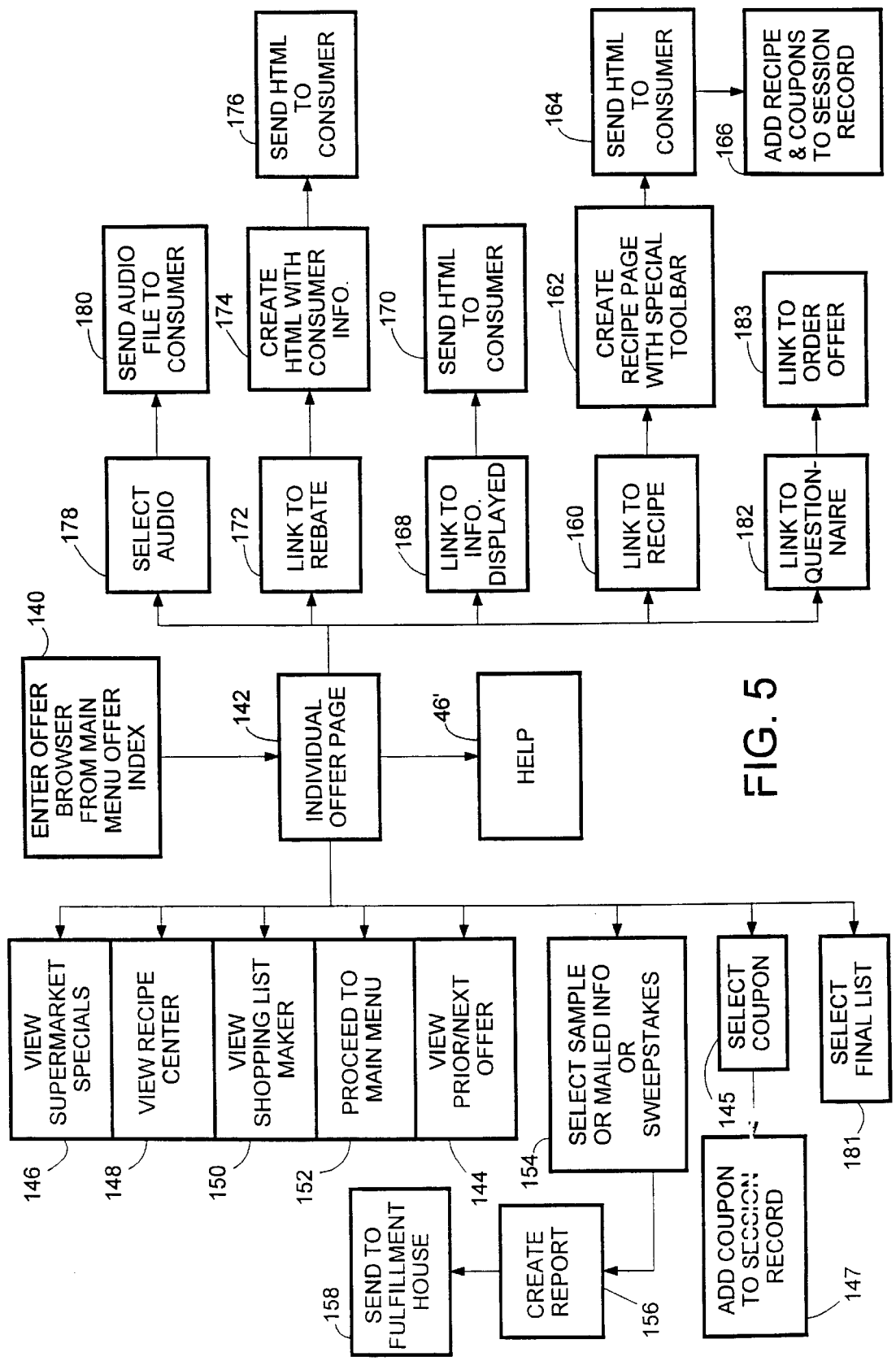
FIG. 5 is a flow diagram of an offer browser process used in the system of the present invention.

Offer Browser:

The offer browser contains advertised offers submitted by product manufacturers. As shown in FIG. 5, the offer browser is entered from the main menu, via block 140, and opens with an individual offer page 142. The offer page contains details of an offer, along with a number of control buttons. The user may select prior or next offers, as indicated in block 144, or may select a coupon based on the offer, as indicated in block 145, the coupon being added to the session record as indicated in block 147. Each offer may have a number of sub-offer options associated with it, including:

adding the coupon to the final list,
entering a sweepstakes competition automatically,
displaying a rebate form, for completion and adding to the final list,
displaying information about the product involved in the offer,
mailing information about the product involved in the offer,
playing an audio message related to the offer,
mailing a sample of the product involved in the offer,
displaying a recipe associated with the product involved in the offer, and
presenting a questionnaire associated with the offer.

Offers can be "clipped" by the user only once per session, and validity checking ensures that each offer enters the session file, and final list, only once. FIG. 5 shows the principal functions that may be performed in the offer browser, including: a help button 46', a view supermarket specials button 146, a view recipe center button 148, a view shopping list maker 150, a return to main menu button 152, and a button 154 to select a sample, mailed information or sweepstakes entry. The latter button initiates generation of a report containing the customer information and is sent to a fulfillment center, as indicated in blocks 156 and 158. Other options shown in FIG. 5 include a link to recipe button 160, actuation of which results in creation of a recipe page (block 162), which is sent to the user or customer (block 164), and also results in the recipe and coupons being added the final list (block 166). Another function is to link to the display of additional offer or product information, as indicated in blocks 168 and 170. Also shown is a link to obtain a rebate (blocks 172, 174 and 176), a link to select audio information (blocks 178 and 180) and a link to the final list 181. Finally, there is a link 182 to a questionnaire that the consumer may complete, and an associated link 183 to an order offer.

Supermarket Specials:

Another main menu function is to provide linkage to a supermarket specials page. Information for this page is provided by participating supermarket retailers and is limited by supermarket shopping area determined from the user's ZIP or postal code.

Figure 6:
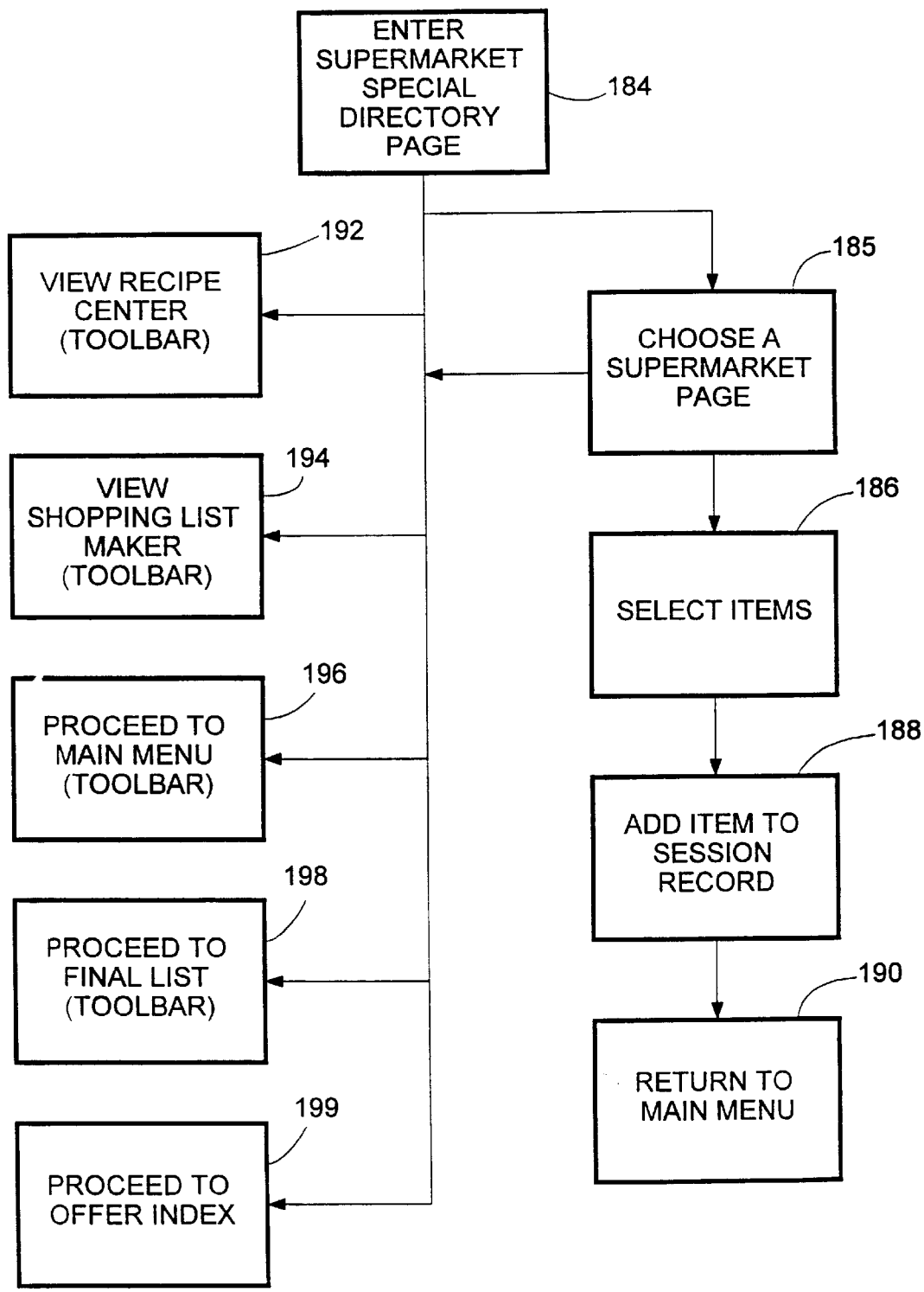
FIG. 6 is a flow diagram of a supermarket specials process used in the system of the present invention.

As shown in FIG. 6, a user of this feature first enters a supermarket special directory page 184, i.e. a directory of supermarkets in his or her shopping area. The user selects a supermarket, as indicated in block 185, and then may select items included in the current list of special offers by the selected supermarket, as indicated in block 186. Each selected item is added to the session record and, subsequently, to the final list, as shown in block 188, and then the process returns to the main menu, as indicated in block 190. If the user elects not to take advantage of any of the supermarket specials, the user has the option to exit to other functions in the system, as shown in blocks 192, 194, 196, 198 and 199.

Figure 7:
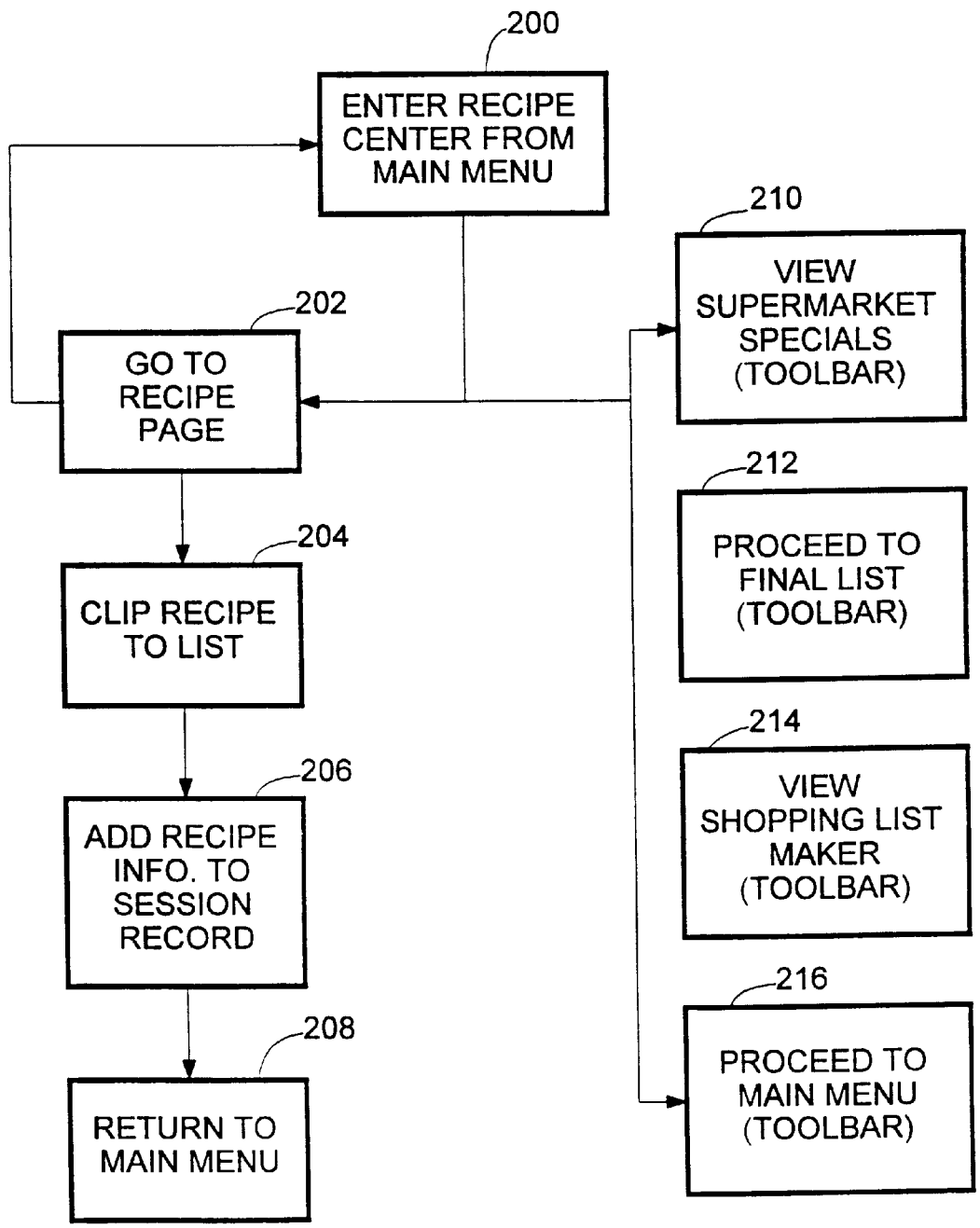
FIG. 7 is a flow diagram of a recipe center process used in the system of the present invention.
Figure 8:
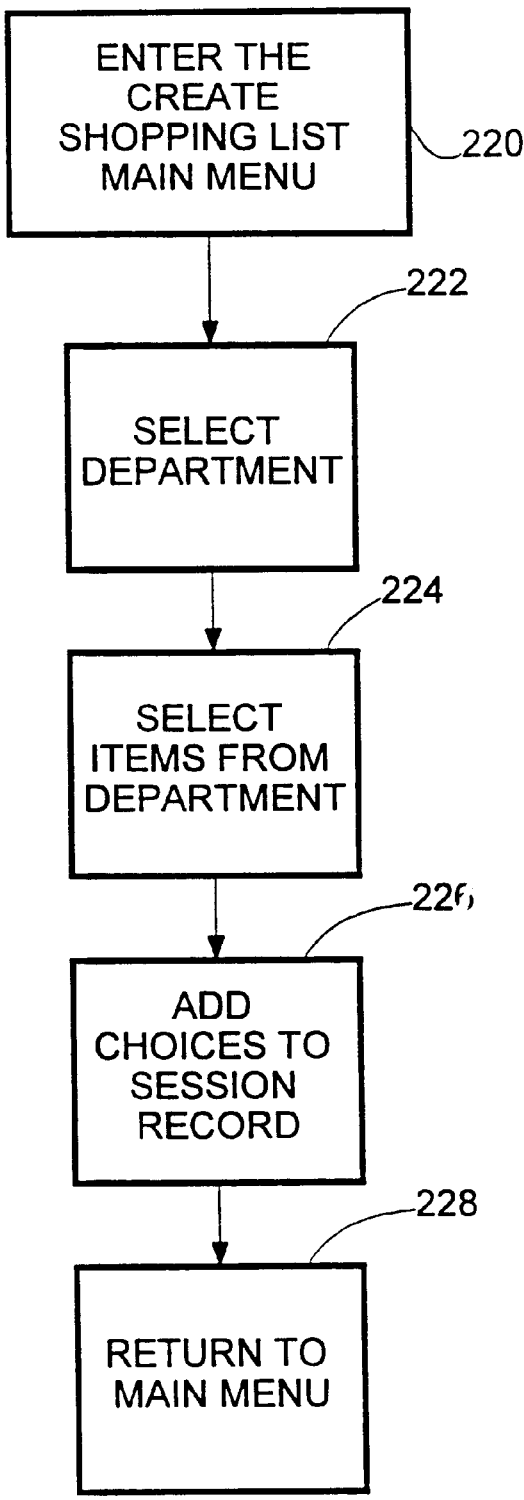
FIG. 8 is a flow diagram of a shopping list maker used in the system of the present invention.

Recipe Center:

FIG. 7 shows the recipe center functions, which are displayed when the user enters the recipe center from the main menu or elsewhere, as indicated in block 200. The user in this page may elect to go to the recipe page (block 202) and clip a recipe from the displayed list of recipes (block 204). A selected ("clipped") recipe will be added to the information in the session record (block 206), for eventual inclusion in the final list, and then recipe center process is terminated by a return to the main menu (block 208). If no recipe is selected, the user may exit the recipe center as shown in blocks 210, 212, 214 and 216. Each recipe page section contains recipe ingredients and instructions, as well as coupon offers for various ingredients or recipe mixes. When the recipe is added to the final list, the associated coupons are also included.

Shopping List Maker:

The shopping list maker is entered, as indicated in block 220, from the main menu, or from any of various other screens. The user may select a store department (block 222), such as meat, produce, and so forth, then select from displayed items sold in that department, as indicated in block 224. The selected items are added to the session record, as indicated in block 226, before a return is made to the main menu, as indicated in block 228. Items may be selected for adding to the shopping list whether or not any of the items is subject to a manufacturers' or supermarket special offer. Optionally, manufacturer and retailer offers may be displayed in the appropriate sections to alert the user of specials available.

Household Registration:

A more specific registration procedure is provided immediately before the consumer enters the phase of final list generation. At log-in, the only information needed to go forward with the session was the consumer's ZIP or postal code. At this stage, before generation of the final list, registration requires a valid E-mail address. Optional information includes a first name and a last name of the consumer, a street address, city and state, and selected demographic information including the number of persons in the household, age categories of persons in the household, and number of pets, if any, in the household. The primary purpose of the registration is customer identification, with a secondary purpose of demographic analysis.

Figure 9:
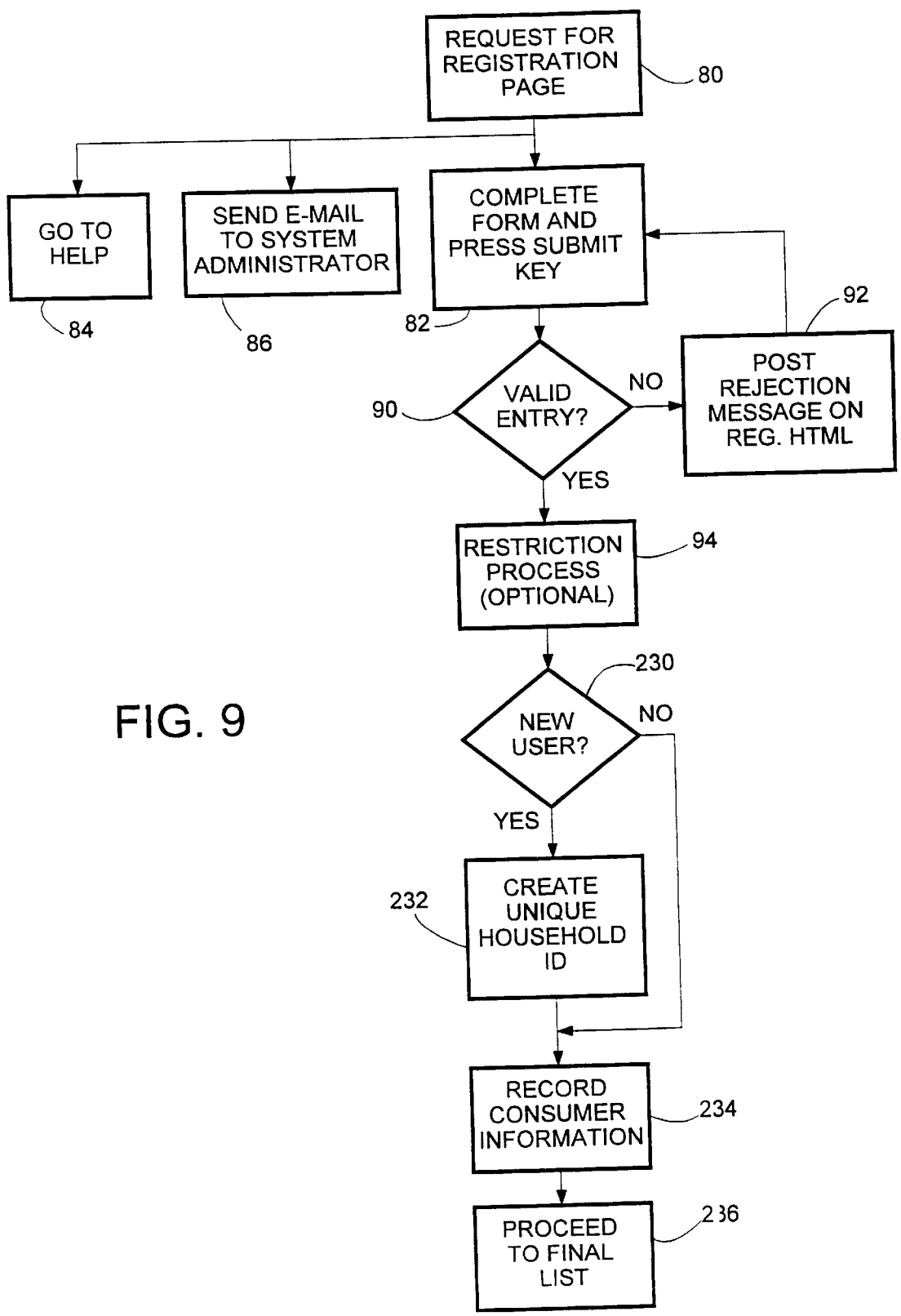
FIG. 9 is a flow diagram of a registration process used in the system of the present invention.

FIG. 9 shows the registration process, which is similar to the Log-in process of FIG. 2, and identical reference numeral are used where appropriate. During the registration process, the customer's E-mail address is verified for correct syntax, as shown in block 90. The first time the customer registers, the E-mail address is used to create a unique household identification (id.), as shown in blocks 230 and 232. Subsequently, the user's household id. is used to reference prior registration information. The next steps are to record or update the consumer information, as indicated in block 234, and to proceed to final list generation, as indicated in block 236.

Figure 10:
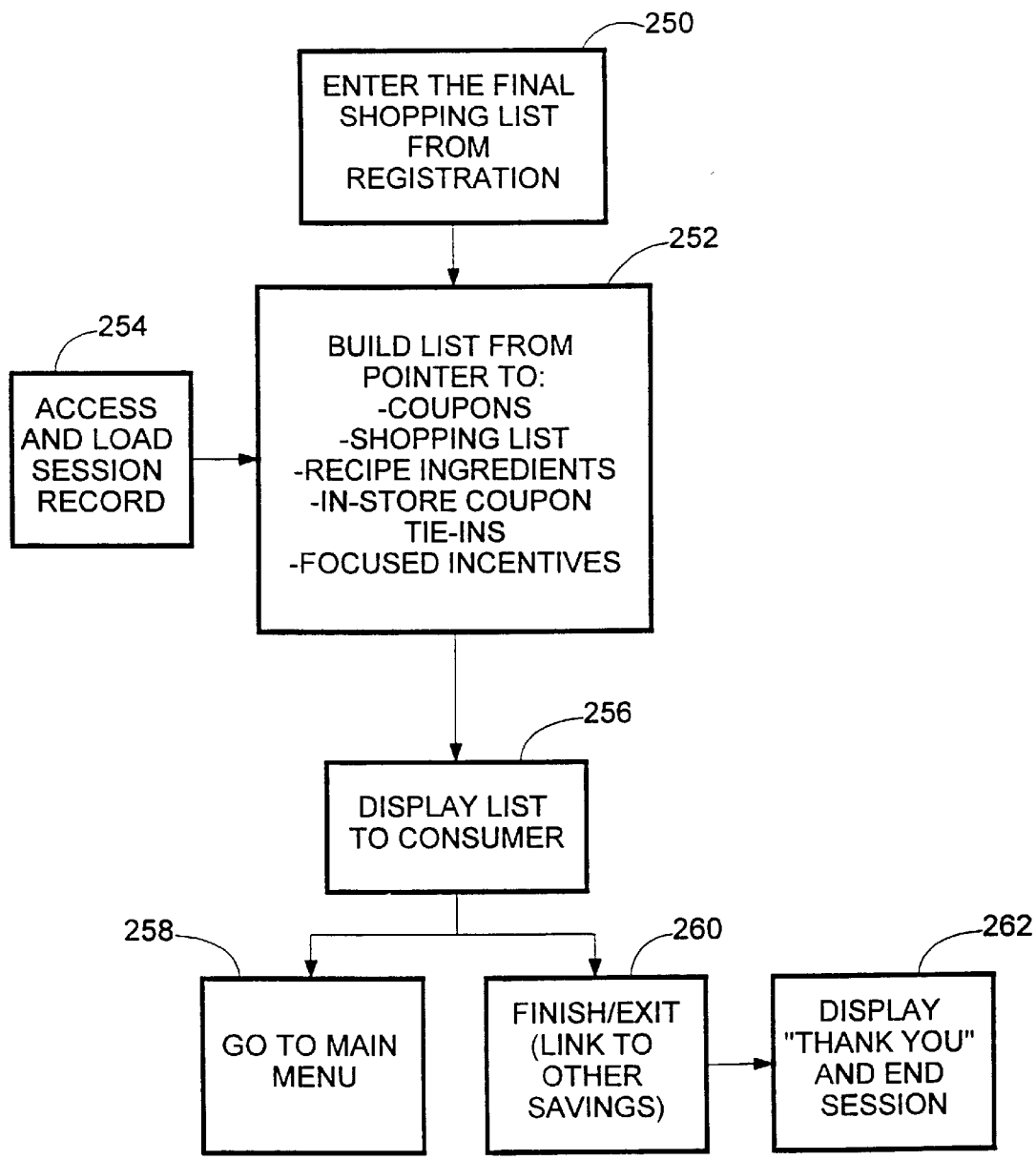
FIG. 10 is a flow diagram of a final list process used in the system of the present invention.

Final List Generation:

FIG. 10 shows the principal functions performed when the user enters the final list generation phase, as indicated in block 250. The system builds the final list, as indicated in block 252, using the session record that has accumulated items selected by the user, as indicated in block 254. The final list is displayed to the user, as indicated in block 256, and the user may then exit to the main menu (block 258) or go to an exit page (block 260), which may have links to other shopper savings opportunities. The final list generation phase also contains hyperlinks to sites established by individual manufacturers and retailers. Finally, the system displays a "thank you" message and ends the session, as indicated in block 262.

When the user enters the final list generation phase, he or she will have to make a selection from a list of supermarkets in the immediate shopping area. All the coupons printed will be specific to this selected supermarket, and invalid everywhere else.

The final list will contain everything that the consumer has selected during the current session, including shopping list items, supermarket specials, a shopping list of recipe ingredients of selected recipes, including any special offers, and may also provide a recipe page giving the ingredients and preparation instructions for each selected recipe, rebate forms complete with customer information, a summary of offers selected, and coupons in redeemable format. Information encoded onto each coupon will include the product code, the consumer's household id., an offer code, an expiration date, a serial number, a valid supermarket id., and the consumer's name.

Dynamic Coupon Creation:

Unlike coupons printed for distribution by mail or printed on an in-store printer, the coupons distributed over the Internet in accordance with the present invention, are created in real time to include information provided by the consumer at his or her remote location. Thus each coupon image is generated dynamically to include this consumer-supplied information, which is required principally for security reasons. As explained earlier, each coupon contains not just a product code and coupon conditions, but also the consumer's name or household id., the retailer id. where the coupon must be redeemed, and a coupon sequence number for added security. Merging all this information into a graphical image in a real time mode for transmission over the computer network posed additional challenges for implementation of the invention.

More specifically, the input information that has to be incorporated into each coupon includes:

The consumer's name and the location coordinates for location on the coupon,

The coupon expiration date and its coordinates,

The logo of the system and its coordinates,

The product offer icon and its coordinates,

The amount of savings and its coordinates,

The terms for receiving savings amount and its coordinates

The legal text and its coordinates,

The redemption text and its coordinates,

The coupon sequence number and its coordinates,

The bar code numbers and their coordinates,

The supermarket designation and its coordinates, and

The coupon size and border parameters.

Figure 11:
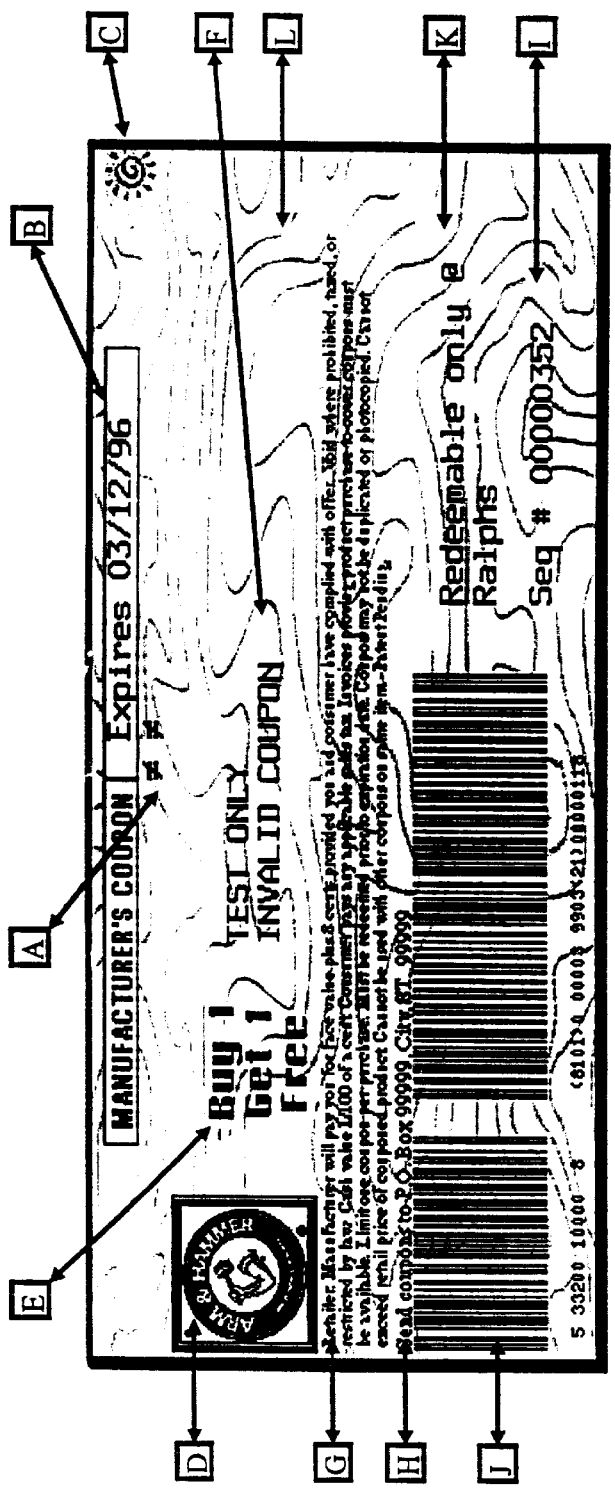
FIG. 11 is a pictorial view of a coupon for purposes of explaining how its components are merged dynamically for transmission to the customer.
Figure 12:
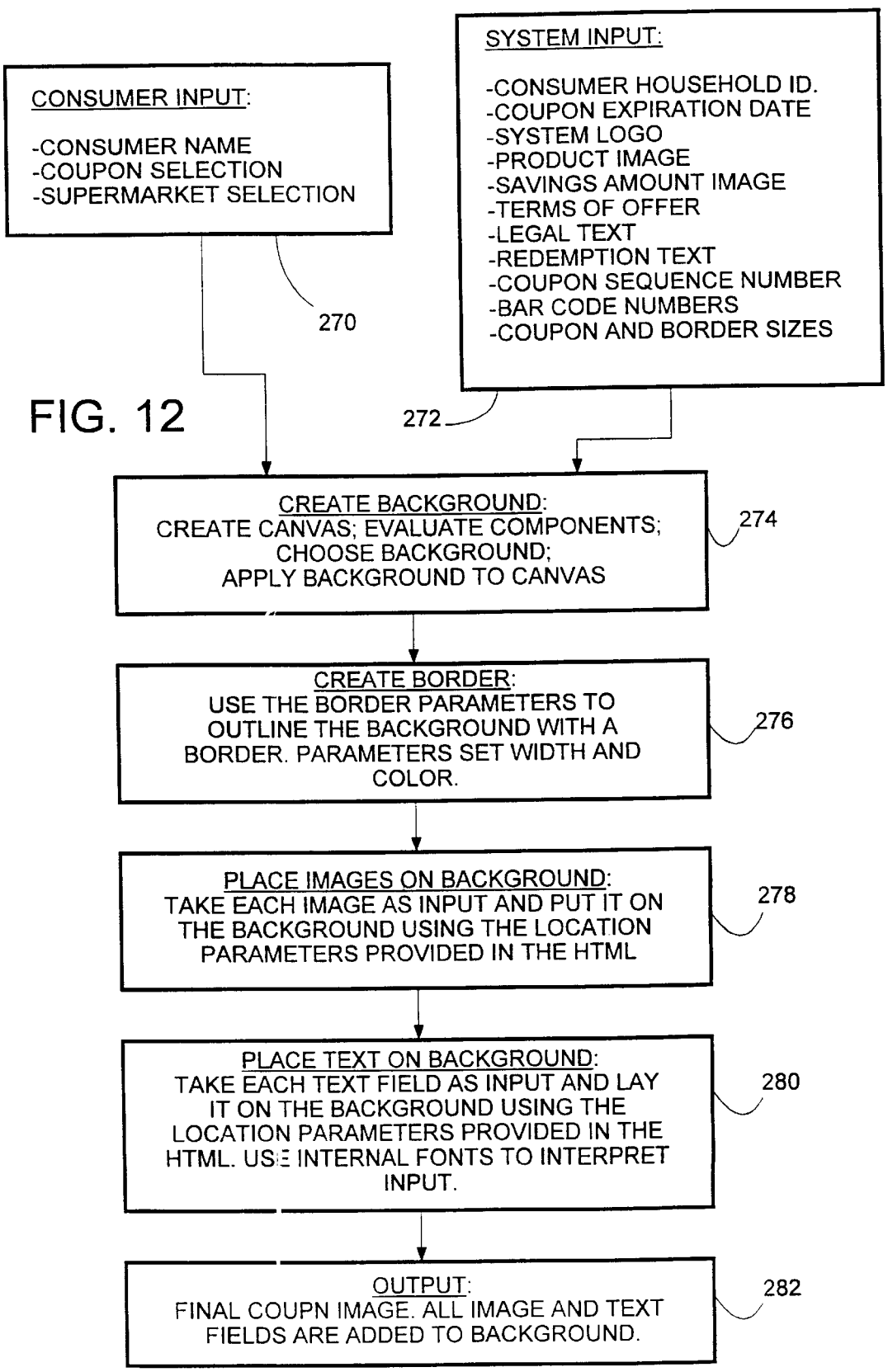
FIG. 12 is a flow diagram of the process of dynamic coupon creation used in the system of the present invention.

FIG. 11 shows a typical coupon format and FIG. 12 summarizes the functions performed in creating the coupon dynamically. Block 270 lists the input items obtained from the consumer: the consumer name, the coupon selection and the supermarket selection. Block 272 lists the input items that are obtained from the system: the consumer's household id., the coupon expiration date, the system logo, the product image, the savings amount image, the terms of the offer, the legal text, the redemption text, the coupon sequence number, the bar code numbers and the coupon border and sizes. Of these, only a few are static, i.e. unchanging from coupon to coupon, such as the system logo and the coupon border and size. The rest are dynamic and dependent on the specific offer selected by the consumer, or dependent on information supplied by the consumer. The expiration date is dynamic in the sense that it is keyed to the coupon issue or print date.

The first step in the coupon creation process, indicated in block 274, is to create the coupon background from the coupon size coordinates, to create an image that will be the background of the coupon. The image is created using the standard format known as the graphics image format (GIF). An important feature of the invention is that the printed coupons preferably include a complex background pattern to reduce the potential of fraudulent creation or modification of the coupons. Several intricate background patterns are stored in advance for use in this step of the coupon creation process. The background pattern for current use is selected from the pre-stored patterns on a regular or random basis. The coupon offer information shown in FIG. 11 is printed over the background to render unauthorized creation, modification or duplication more difficult. Basically, the creation of the background includes the steps of first creating a "canvas" for the coupon, such as a one-color background on which the other image elements will be overlaid; then evaluating the coupon components (the retailer, product, text messages and so forth); then selecting a background image based on random or preset parameters; and applying the background image to the canvas. Selection of the background pattern may be based, in part, on the content of the coupon. For example, different background images may be used for different manufacturers, different products, or even different consumers. The background image is a complex pattern of relatively light intensity, so as not to interfere with scanned bar codes on the coupon. The pattern may contain textual characters, or a repetitive design, or may be of a variable and seemingly random nature, as depicted in FIG. 11. The complexity and varied nature of the background image makes unauthorized alteration or creation of coupons extremely difficult, because alteration of any of the coupon components, such as price, bar code or text, will also visibly disturb the background image. Although counterfeit coupons may not always be detected in a retail store, the presence of the background pattern makes it likely that they will be detected at some later stage of coupon redemption.

Next, in block 276, the coupon border is created using the border parameters to outline the background with a border of selected width and color. Next, as indicated in block 278, the graphics images in the inputs are placed on the background using the location images provided in the hypertext markup language (HTML).

Next, as indicated in block 280, the text input items, including the bar codes, are placed on the background image using the location parameters provided in the HTML format. Each text character, including ASCII characters and the bar-code numerical quantities, is converted to a graphical image using internally stored font files. Finally, the composite image of the coupon obtained from the preceding steps is merged with other output data and is output to the consumer's computer, as indicated in block 282.

Figure 13:
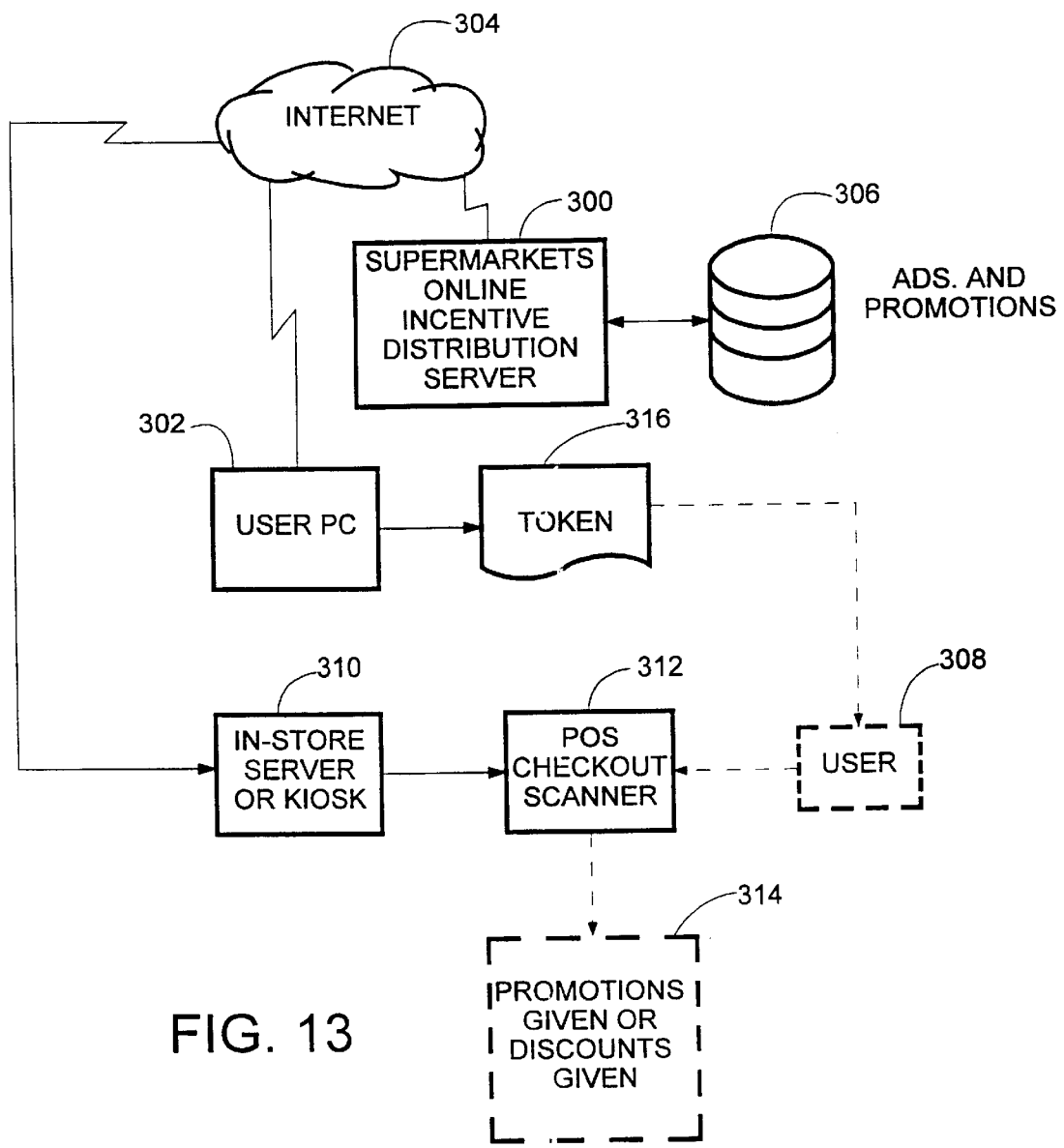
FIG. 13 is a simplified block diagram depicting an alternate embodiment of the invention in which coupons are not distributed directly to customers.

Transmitting Incentives without Physical Coupons:

An alternative arrangement for distributing purchasing incentives over the Internet is illustrated in FIG. 13. This figure shows an incentive distribution server computer 300 and a user's personal computer 302 connected together through a computer network, indicated by the network cloud 304. The server 300 has an associated storage device 306 on which are stored multiple advertisements and promotions. The system as described thus far operates in much the same way as the system described above with reference to FIGS. 1–11. A user 308 logs on to the server 300 through the network 304 and selects from a variety of offers stored on the storage device 306 by manufacturers and retailers. However, instead of transmitting the coupons to the user computer 302, the server 300 functions in accordance with one of the following options:

(a) The server 300 transmits purchase incentive data to an in-store server 310 in the supermarket selected by the user 308, which gives the user an appropriate discount automatically when he or she presents items for checkout and a point-of-sale checkout scanner 312, with appropriate identification recognized by the in-store server 310. Promotions or discounts are given to the customer, as indicated at 314. The server 300 may also send an advisory message to the customer to confirm the existence of the promotion.

(b) The server 300 transmits the image of a token 316 of some kind to the user's computer 302. The token defines the coupon offer, preferably in coded form, such as in bar codes, but is not recognizable as a coupon. The token may, for example, be an encoded confirmation number. The user 308 presents the token 316 at the store he or she has selected, and receives the appropriate discount or promotion automatically.

Figure 14:
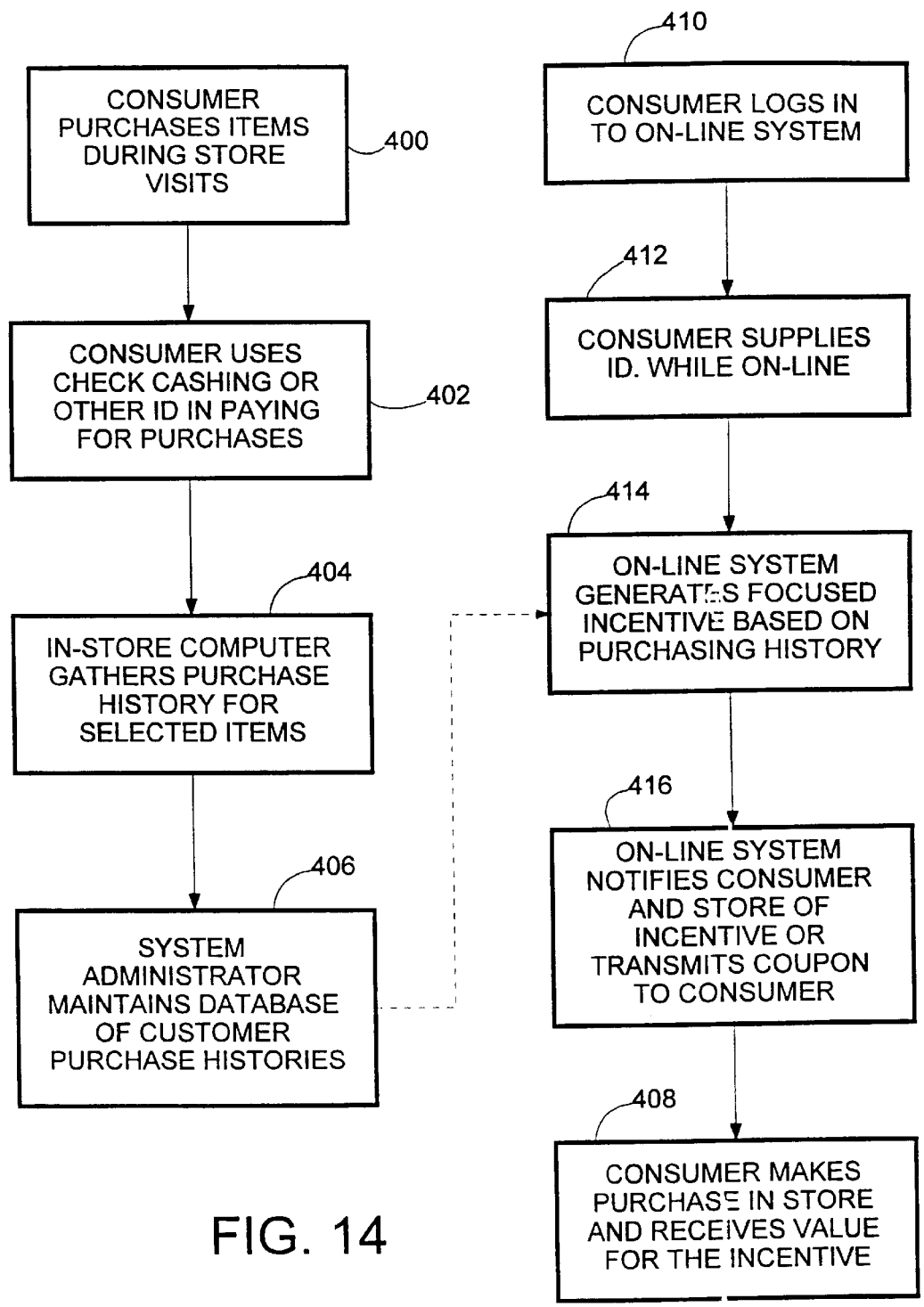
FIG. 14 is a simplified block diagram depicting another aspect of the invention, in which customer id. information volunteered by the on-line customer is used to generate more focused purchase incentives to be transmitted to the customer.

Generation and Delivery of Focused Incentives:

The invention may be further enhanced by employing individual purchase histories of individual customers, as depicted in FIG. 14. The shopping behavior of customers is routinely tracked in connection with the generation of in-store incentives in the form of discount coupons printed as the customer pays for his or her purchases, as shown in blocks 400 and 402. Each customer's purchasing behavior is tracked only if the customer provides some form of unique identification during the purchase transactions, such as a check-cashing card, a credit card, a magnetically encoded check, or other form of identification. The purchase of any of a number of selected items can then be associated with a specific customer id., as indicated in block 404, and a system administrator maintains a database of customer purchase histories, as indicated in block 406. When the customer visits the store, a focused incentive may be printed based on a selected event in the customer's past shopping behavior, as indicated in block 408. In accordance with this aspect of the present invention, a customer who has logged in to the system (block 410) is asked to supply the customer id. used for in-store purchases (block 412). The customer id. may be a check-cashing card number, or other form of identification that allows the system to access the customer's purchasing history, and then select a purchasing incentive based on some aspect of the customer's prior shopping history, as indicated in block 414. This incentive is transmitted to the customer, as indicated in block 416, in the form of an Internet message, for retrieval when the customer next accesses the Web site or checks for electronic mail (E-mail). The incentive message informs the customer that one or more specific offers are available and may be received at the checkout stand when the prerequisite products are purchased. Alternatively, a paper coupon may be transmitted to the customer's computer site and printed for later presentation in the store.

Customers who volunteer the necessary linkage in the form of their customer id. may be rewarded in some manner. The customer id. may be requested only once and then used for all subsequent sessions in which the customer logs in to the system. Once the linkage is established, the consumer purchase history data or targeted incentives needed to support this capability of the invention are periodically transferred from the shopper purchase history system to the on-line system of the present invention.

Figure 15:
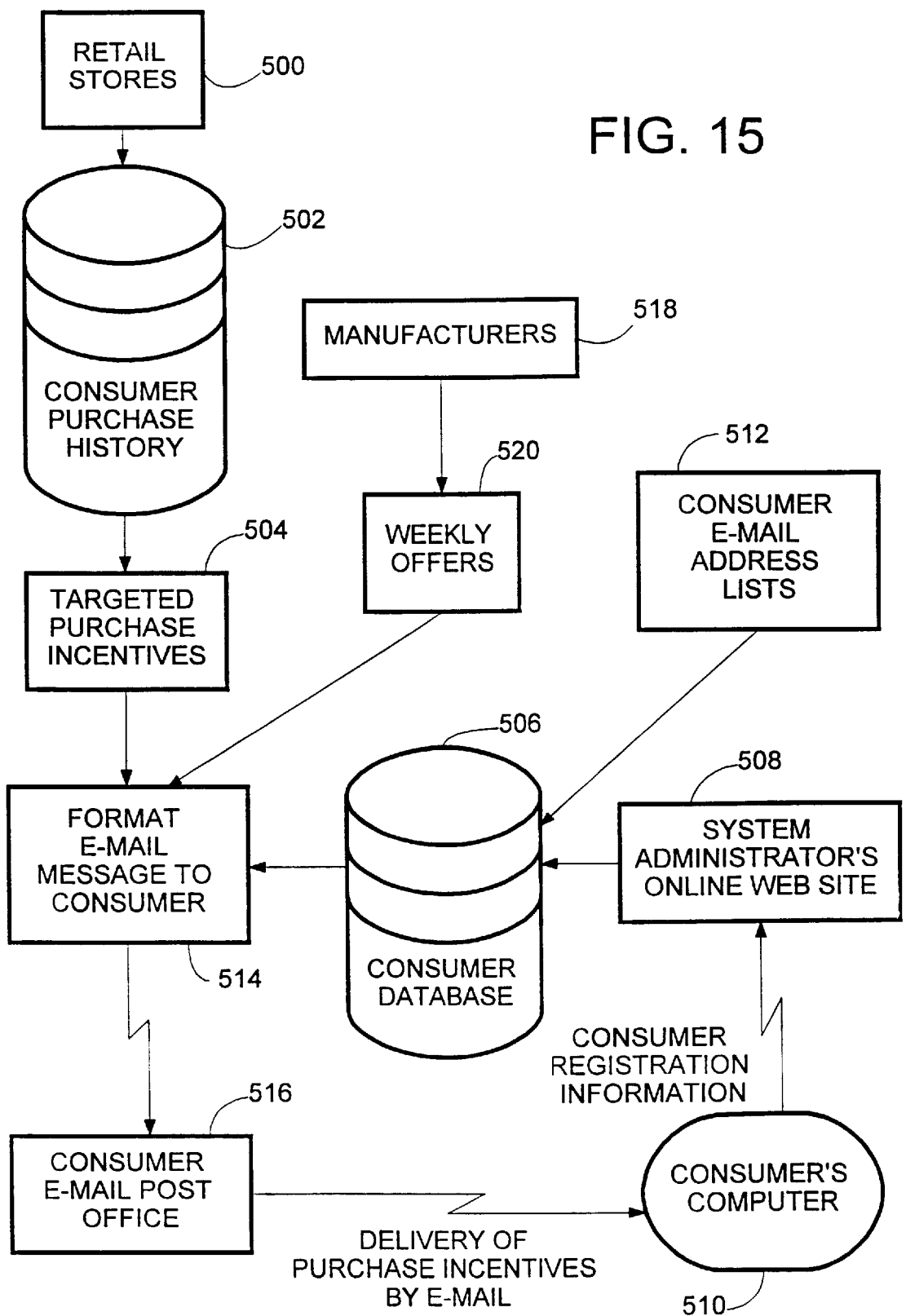
FIG. 15 is a simplified block diagram depicting another aspect of the invention, whereby targeted and untargeted incentives are delivered to consumers by electronic mail.

Delivery of Incentives by E-mail:

As shown in FIG. 15, the system of the invention also has the capability to deliver targeted or untargeted incentives to consumers through their online E-mail addresses on the Internet or another computer network. Retail stores, indicated by block 500, gather purchase data and either the retailers or an independent system administrator accumulates the consumer purchase history in a database, indicated at 502. The database 502 is developed as a result of consumers being uniquely identified on each visit to the store, by use of a frequent shopper card, a credit card or some other form of identification.

Targeted purchase incentives are generated from the consumer purchase history database 502, as indicated in block 504. The system administrator also maintains a consumer database 506, which identifies consumers by their E-mail addresses. Alternatively, the consumer database 506 may be integrated with the consumer purchase history database 502. The consumer database 506 receives data primarily from the system administrator's Web site, indicated at block 508, which, in turn, receives a consumer's E-mail address from each consumer's computer, indicated at 510. The consumer database 506 may also receive E-mail addresses from independent consumer E-mail address lists, indicated in block 512.

Using E-mail address information from the consumer database 506 and targeted incentive information based on the consumer's purchase history, from database 502, the system of the invention formats an E-mail message to the consumer, as indicated in block 514, and transmits it to the consumer's computer 510 through the consumers E-mail "post office," as indicated in block 516. The purchasing incentives are delivered to the consumer by electronic mail for subsequent printing of a coupon, or simply in the form of a token of some kind to be taken to the store. This approach allows producing targeted, time phased incentives based on the consumer's actual buying patterns and preferences, and delivering them in the home prior to the consumer's shopping trip.

The same delivery mechanism can also be used to deliver untargeted or less targeted incentives from manufacturers, indicated at 518. The manufacturers may, for example, generate weekly offers, as shown in block 520, which the system delivers to selected consumers. Selection of consumers may be based on a customer profile or on demographic information maintained by the system administrator and selected by the manufacturer. For example, the manufacturer may identify the type of household it would like to target and the incentive would be delivered to designated consumers in the consumer database 506 who meet the profile qualifications.

Another aspect of the invention permits the delivery via E-mail of general messages or incentives to consumers who meet selected non-demographic criteria, such as those who have not recently visited the Web site, or those who have not selected or redeemed online purchase incentives during a recent selected period. In such cases, a special promotion might be delivered to the consumer to encourage more active participation. Untargeted messages or notices can also be broadcast to large numbers of consumers to encourage them to visit a specific retail store, or to purchase a specific manufacturer's product, or to visit the Web site.

Figure 16:
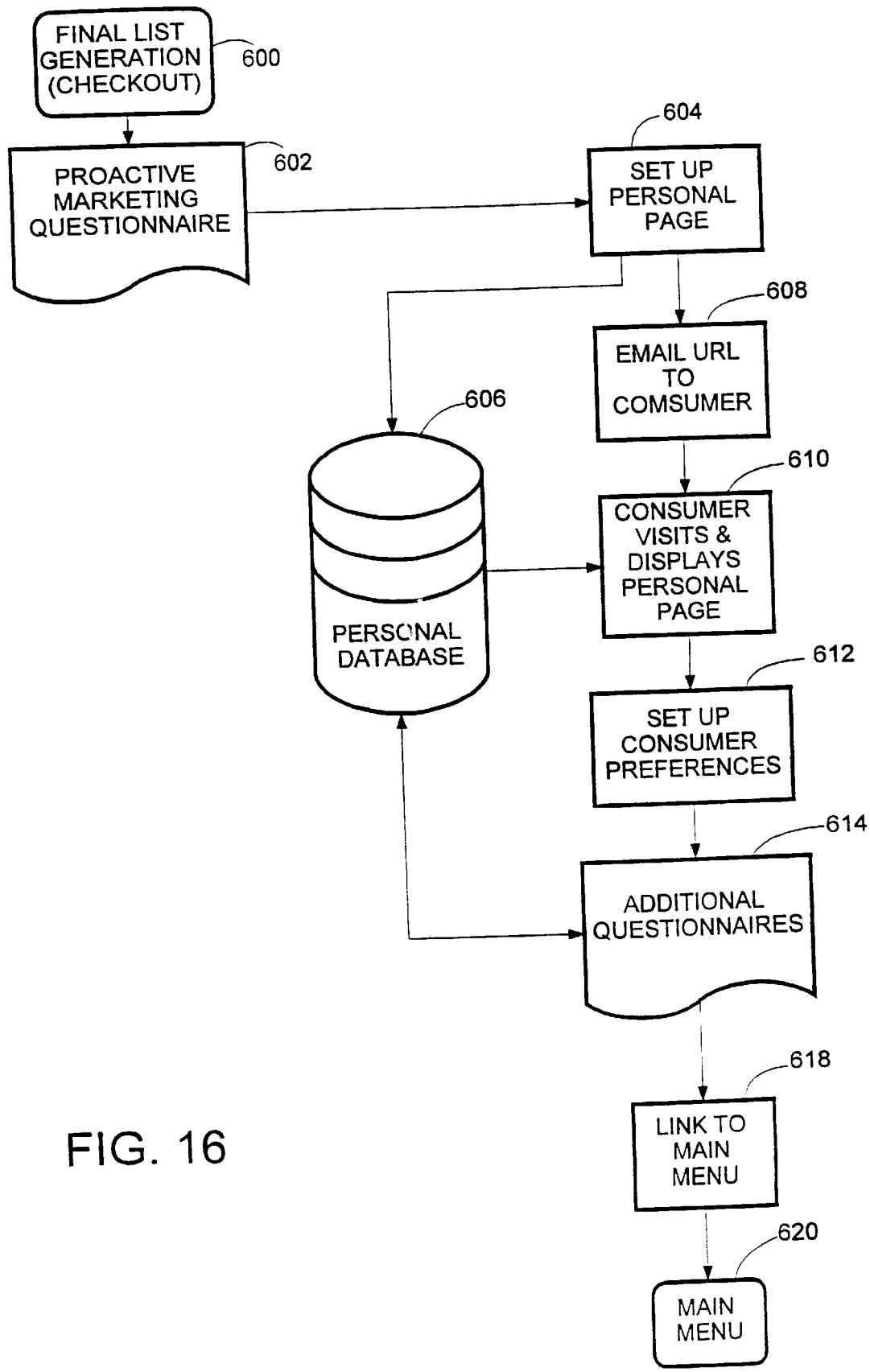
FIG. 16 is a simplified block diagram showing how data is gathered and updated for us in a consumer personal page.

Personal Page:

Another feature of the invention is the more direct targeting of incentives using a "personal page" for each consumer who wants one established. As indicated in FIG. 16, when the consumer has logged in to the system and is about to sign off, through the final list generation or checkout phase 600, he or she may be asked to complete a marketing questionnaire 602. The questionnaire requests selected personal or demographic information, which the consumer may elect to volunteer once the benefits of establishing a "personal" Web page have been explained. If the consumer elects not to provide the information, the system provides a normal exit and log out procedure. However, if the required information is provided, the system sets up a personal page for the consumer, as indicated in block 604, and establishes a personal database 606, also for the individual consumer. The personal page displays a screen of information that is consumer-specific in many respects but will, of course, contain some data that is supplied to all consumers who have personal pages. The page is preferably personalized with the consumer's name and may also contain the shopping list, if any, already generated by the consumer in the current online session. Significantly, the personal page will also contain offers and incentives targeted to the specific consumer, as further explained below. When the personal page is first set up, the system generates an E-mail message to the consumer to advise him or her of the address for gaining access to the personal page, as indicated at 608.

Subsequently, when the consumer visits the personal page, as indicated at 610, he or she has an opportunity to select personal preferences as to the content of the page, as indicated in block 612. On each visit to the personal page, the consumer may be asked additional questions concerning demographics, personal purchase preferences, and so forth, as indicated at 614, the responses being used to update the personal database 606, as indicated by line 616. From the personal page, the consumer may elect to follow a link 618 back to the system main menu 620.

All of the steps depicted in FIG. 16 pertain to setting up the personal page for a consumer and gathering information from the consumer for establishing and updating the personal page. When visiting the personal page, the consumer may select any of the incentives or offers displayed, and these will be incorporated into the consumer order in the same manner as described above.

Figure 17:
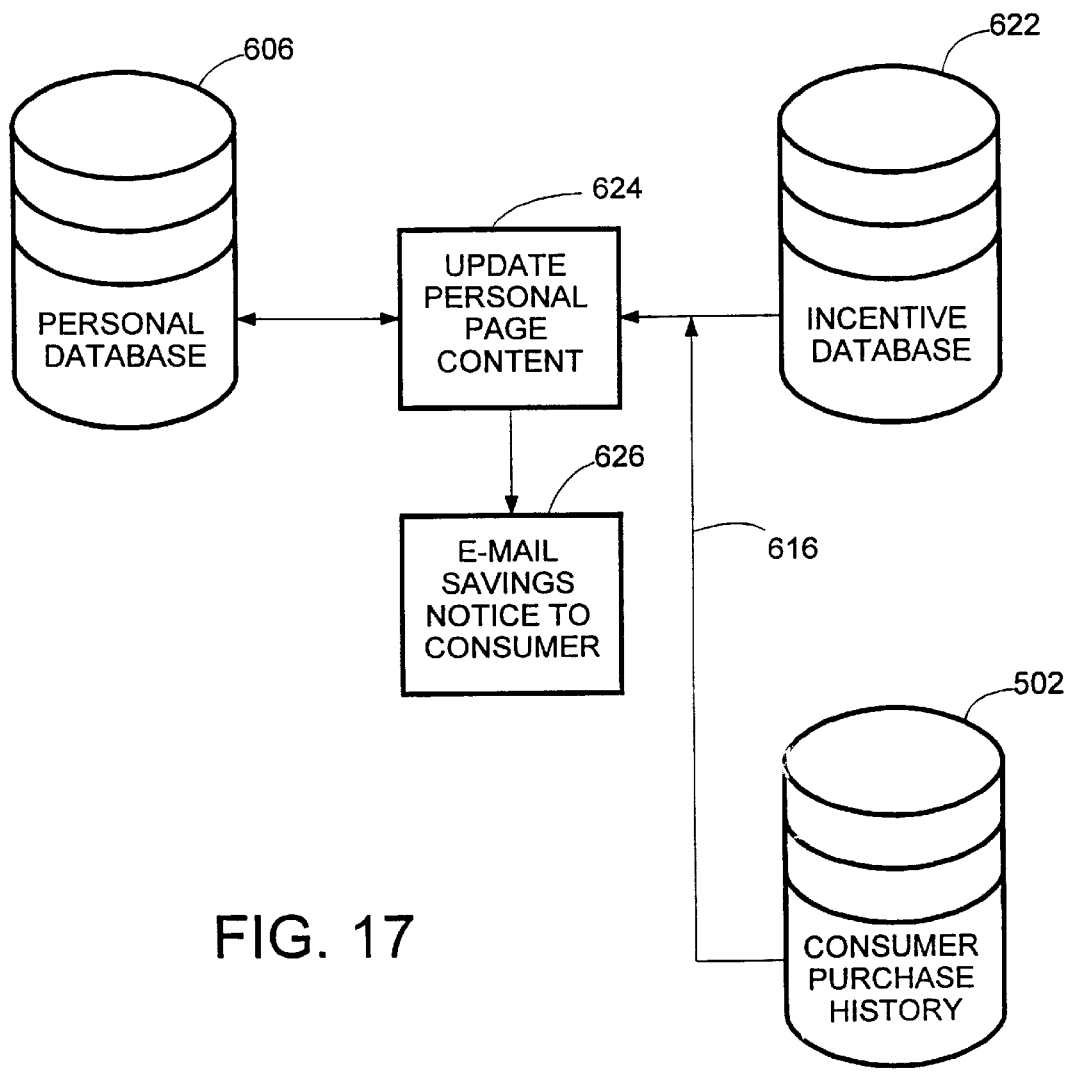
FIG. 17 is a simplified block diagram showing how a consumer personal page is automatically updated based on consumer purchasing activity.

FIG. 17 depicts how the personal database 606 for each consumer is automatically updated based on consumer purchases and on changes to available incentives. The functions shown are typically performed periodically, such as every day or week, but can also be performed in real time. The consumer purchase history 502, which was discussed with reference to FIG. 15, is generated and updated from various sources pertaining to the shopping activities of all identifiable consumers. In-store loyalty programs based on past purchasing activity are one source of such data. Any online shopping activity is another source. Data from the consumer purchase history database 502 and from a database 622 of available incentives are joined together and used to generate incentives to be displayed on each consumer's personal page. The personal page contents are updated, as indicated in block 624, the personal database 606 is updated to reflect these changes, and the consumer is notified by E-mail, as indicated in block 626, that the personal page has been updated. The consumer can then go to the personal page and view the updated personal page.

Use of the personal page permits manufacturers and retailers to focus incentives on specific consumers, based on demographic data and prior purchasing data in the consumer's personal database 606. Consumers who have consented to have the personal page established, are much more likely to respond favorably to incentive offers in their areas of interest, and manufacturers are more likely to provide higher value offers when they are targeted to specific consumers of interest to the manufacturers.

Figure 18:
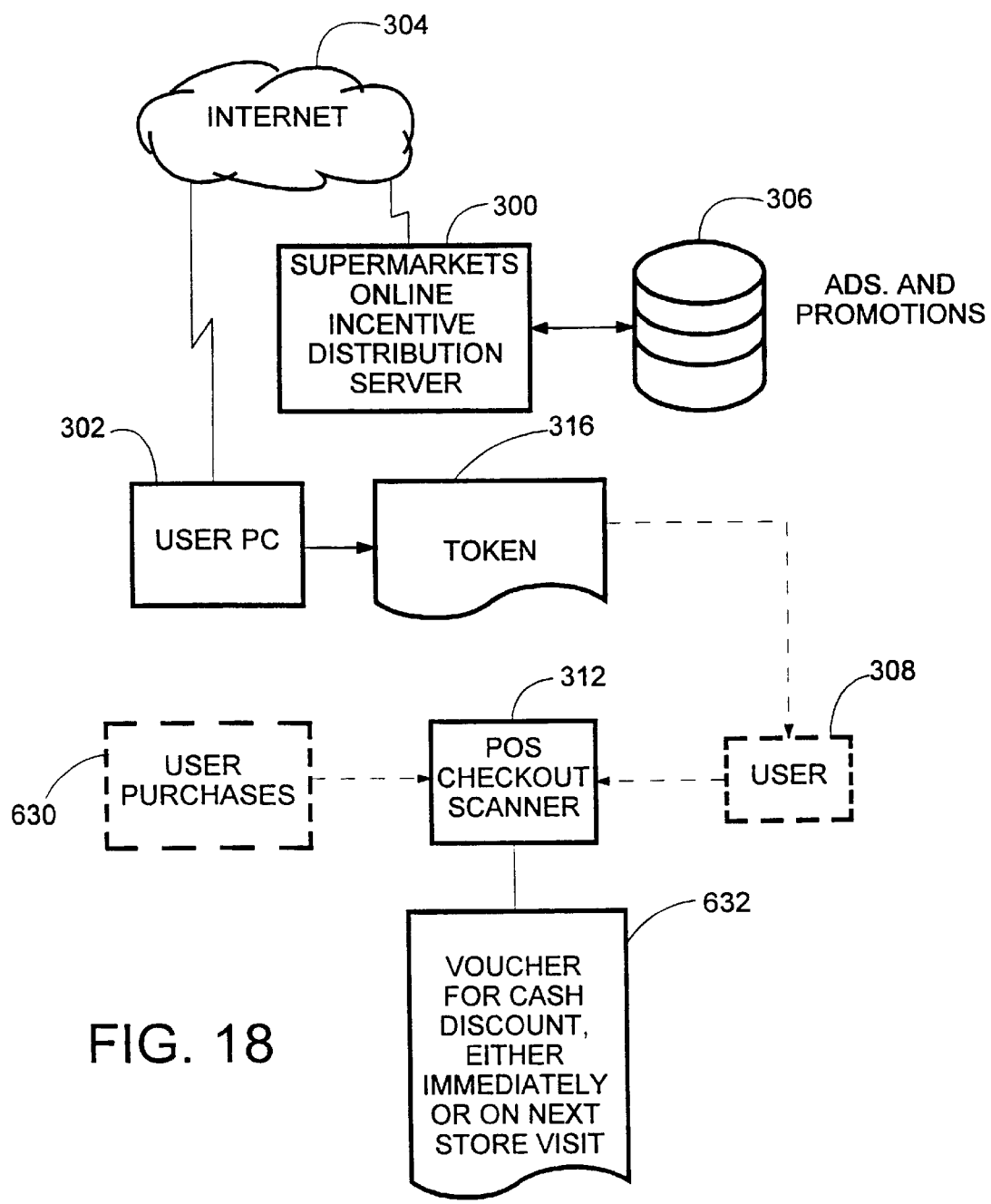
FIG. 18 is a simplified block diagram depicting another alternate embodiment of the invention, in which a token is generated instead of a coupon, and the token is presented at a store in order to obtain a cash discount voucher.

"Token and Voucher" Instead of Coupon:

A potential difficulty with distributing coupons through a computer network is that manufacturers and retailers may perceive such a system as being more prone to fraud than conventional coupon distribution methods. The concern, of course, is that users may alter the content of coupon images (e.g., the coupon value), or print a coupon image repeatedly, or compose a fraudulent coupon from scratch. Printing coupons with a complex background pattern, as discussed above, renders unauthorized coupon modification or creation more difficult, but a potential for fraud still exists. Generating a "token" instead of coupon, as described above with reference to FIG. 13, also reduces the risk of fraud. Another technique similar to this is depicted in FIG. 18. A token 316 is generated by the user's computer 302 after interaction with the distribution server 300. The user chooses from incentive offers as described above, but instead of a coupon the computer 302 generates the token 316.

The token 316 includes coded information, e.g., bar-coded information, establishing that the user visited the network site and selected one or more promoted items. Although the token is described in this specification as being in printed form, including bar-coded information, clearly other forms of the token may be preferred as different technologies develop. For example, the token may be encoded onto a user's identification card, using either magnetic stripe recording or "smart card" technology. For this aspect of the invention, the physical form of the token is of no consequence, since it is used only to establish that the user visited the computer network site and selected one or more promoted items. At about the same time that the token is generated, the user also receives a shopping list that identifies the promoted items that were selected during the site visit, as well as any other selected items. Although the token is not a coupon and has no value per se, it is a trigger mechanism that the user/consumer can present at a qualified retail store, to receive a voucher for a cumulative cash discount based on the promoted items purchased by the consumer.

When the user 308 takes the token to the selected store and makes purchases 630, the purchased items and the token are all scanned by the point-of-sale checkout scanner 312 and a voucher 632 is generated, based on the user's purchase of qualifying items. Each purchase in the user's order that matches weekly offers that have been predefined in the advertisements and promotions database 306 and have been selected by the user, are listed on the voucher 632. The voucher 632 provides a cumulative cash discount to the user (either immediately or on a subsequent store visit, no matter which items are purchased in the subsequent visit). The voucher also contains a bar-coded price look-up (PLU) code, which requires the store checker to enter a "price," i.e. the total voucher amount, in order to process the voucher and apply the discount to the user's order.

The token and voucher program provides advantages for all parties to each transaction. First, for manufacturers there is increased security for promotions introduced by computer networks such as the Internet. Instead of printing potentially reproducible monochrome coupons that are effectively redeemable for cash, the user's home computer generates a token that has to be taken to a store at which the qualifying products must be purchased by user before a cash voucher is generated. Since the token system ensures that the discounted products are purchased, the manufacturer pays only for positive results for each incentive offered. Moreover, the system avoids the inherent negative connotations of coupons.

Similarly, for the retailer, handling and redemption problems associated with black and white coupons generated by computer users are eliminated. The retailer also benefits because, one version of the system requires the user to return to the store to present the voucher. Consumers who are also Internet subscribers benefit because the system should allow for the distribution of more incentives, and incentives of higher value, over the Internet. The system also reduces the consumer paperwork because multiple coupons do not have to be clipped, printed and taken to the store. Only a single token is needed to make the required purchases and obtain a voucher for a cumulative cash discount, redeemable either immediately or at the next store or chain visit.

Conclusion:

It will be appreciated from the foregoing that the present invention represents a significant advance over other systems for distributing purchasing incentives and other shopping aids via computer network. In particular, the system and method of the invention provide for incentive distribution in such a way that the opportunities for fraudulent generation or use of coupons is minimized, since each coupon uniquely identifies the consumer to whom is was issued and the retail store or chain in which it can be redeemed. The invention also uses a novel technique for dynamically creating coupon images for transmission over a computer network. In an alternative embodiment of the invention, physical coupons are not printed at all, but coupon data are either transmitted directly to the retail store, or is sent to the consumer in the form of a token instead of a coupon. In addition to the transmission of purchasing incentives over a computer network, the present invention also provides a medium for transmitting other consumer planning aids, such as shopping list selections, recipe selections, rebate offers, and product information, over the network. In a further extension of the invention, if the customer provides an identification number used in payment for in-store purchases, more focused incentives can be transmitted to the customer based on his or her prior shopping history. It will also be appreciated that, although a limited number embodiments of the invention have been described in detail for purposes of illustration, various modifications may be made without departing from the spirit and scope of the invention. Accordingly, the invention should not be limited except as by the appended claims.

We claim:

1. A computer implemented method for determining purchasing incentives for consumers, comprising the steps of:

storing in a purchase history database product data for products purchased in association with a unique identifier;

transmitting a prompt for personal information from a main computer to a personal computer over a computer network;

transmitting personal information data from said personal computer to said main computer over said computer network in response to said prompt, said personal information data including an identity code;

generating page data defining a personal web page that is accessible over said computer network, said personal web page based at least in part on said personal information data transmitted from said personal computer to said main computer, assigning a web page address to said personal web page based upon said personal information data, storing said page data defining said personal web page in a personal page database;

determining a purchase incentive depending on (1) said product data stored in said purchase history database or (2) said page data stored in said personal page database; and updating said page data so that said personal web page will display said purchase incentive.

2. The method of claim 1, wherein said step of storing said page data comprises the step of storing said page data in association with said unique identifier.

3. The method of claim 1, wherein said step of storing in said purchase history database said product data comprises the step of storing in said purchase history database said product data for products purchased in association with said unique identifier, whereby said unique identifier uniquely identifies a consumer.

4. The method of claim 1, further comprising transmitting an advisory messages concerning said updated personal page from said main computer to said personal computer over said computer network.

5. The method of claim 1, wherein said step of determining said purchase incentive comprises determining said purchase incentive based on offers from a product manufacturer.

6. The method of claim 1, wherein said step of determining said purchase incentive comprises determining said purchase incentive based on offers from a product retailer.

7. The method of claim 1, wherein said step of determining said purchase incentive comprises determining said purchase incentive based on offers from a product manufacturer and offers from a product retailer.

8. The method of claim 1, wherein said step of determining said purchase incentive comprises determining said purchase incentive on a basis of demographic data stored in said personal page database.

9. The method of claim 1, wherein said step of determining purchase incentive comprises determining said purchase incentive on a basis a frequency of usage of purchase incentives by a consumer.

10. The method of claim 1, wherein said step of determining said purchase incentive comprises determining said purchase incentive on a basis a frequency of usage of said personal page by a consumer.

11. The method of claim 1, wherein said computer network comprises one of an intranet and the Internet.

12. A method according to claim 1, wherein said step of assigning a web page address comprises assigning a web page address based upon said identity code.

13. A method according to claim 1 further comprising the step of transmitting data defining said personal web page to said personal computer.

14. A system for providing purchasing incentives to consumers, comprising:

a main computer having a purchase history database for storing product data for products purchased in association with a unique identifier and a personal page database;

a computer network;

at least one personal computer coupled to said main computer via said computer network;

said main computer configured to transmit a prompt for personal information to said at least one personal computer over said computer network;

said at least one personal computer configured to transmit personal information data from to said main computer over said computer network in response to said prompt;

said main computer configured to generate page data defining a personal web page that is accessible over said computer network, said personal web page based at least in part on said personal information data transmitted from said at least one personal computer to said main computer;

said main computer configured to assign a web page address to said personal web page based upon said personal information data;

said main computer configured to store said page data defining said personal web page in said personal page database;

said main computer configured to determine a purchase incentive depending on (1) said product data stored in said purchase history database or (2) said page data stored in said personal page database; and said main computer configured to update said page data so that said personal web page will display said purchase incentive.

15. The system of claim 14, wherein said main computer is configured to store said page data in association with said unique identifier.

16. The system of claim 14, wherein said unique identifier is configured to uniquely identify a consumer.

17. The system of claim 14, wherein said main computer is configured to transmit an advisory messages concerning said update to said at least one personal computer over said computer network.

18. The system of claim 14, wherein said main computer is configured to determine said purchase incentive based on offers from a product manufacturer.

19. The system of claim 14, wherein said main computer is configured to determine said purchase incentive based on offers from a product retailer.

20. The system of claim 14, wherein said main computer is configured to determine said purchase incentive based on offers from a product manufacturer and based on offers from a product retailer.

21. The system of claim 14, wherein said main computer is configured to determine said purchase incentive based on demographic data stored in said personal page database.

22. The system of claim 14, wherein said main computer is configured to determine said purchase incentive based on a frequency of usage of purchase incentives by a consumer.

23. The system of claim 14, wherein said main computer is configured to determine said purchase incentive based on a frequency of usage of said personal web page.

24. The system of claim 14, wherein said computer network comprises one of an intranet and the Internet.

25. A system according to claim 14 wherein said main computer is configured to assign a web page address to said personal web page based upon said identity code.

26. A system according to claim 14 wherein said main computer is configured to transmit data defining said personal web page to said personal computer.

27. A computer program product comprising a computer storage medium having a computer program therein for providing purchasing incentives to consumers, said computer program performing the steps of:

storing in a purchase history database product data for products purchased in association with a unique identifier;

transmitting a prompt for personal information from a main computer to a personal computer over a computer network;

transmitting personal information data from said personal computer to said main computer over said computer network in response to said prompt;

generating page data defining a personal web page that is accessible over said computer network, said personal web page based at least in part on said personal information data transmitted from said personal computer to said main computer;

assigning a web page address to said personal web page based upon said personal information data;

storing said page data defining said personal web page in a personal page database;

determining a purchase incentive depending on (1) said product data stored in said purchase history database or (2) said page data stored in said personal page database; and updating said page data so that said personal web page will display said purchase incentive.

28. The computer program product of claim 27, wherein said step of storing said page data comprises the step of storing said page data in association with said unique identifier.

29. The computer program product of claim 27, wherein said step of storing in said purchase history database said product data comprises the step of storing in said purchase history database said product data for products purchased in association with said unique identifier, whereby said unique identifier uniquely identifies a consumer.

30. The computer program product of claim 27, further comprising transmitting an advisory message concerning said updating from said main computer to said personal computer over said computer network.

31. The computer program product of claim 27, wherein said step of determining said purchase incentive comprises determining said purchase incentive based on offers from a product manufacturer.

32. The computer program product of claim 27, wherein said step of determining said purchase incentive comprises determining said purchase incentive based on offers from a product retailer.

33. The computer program product of claim 27, wherein said step of determining said purchase incentive comprises determining said purchase incentive based on offers from a product manufacturer and offers from a product retailer.

34. The computer program product of claim 27, wherein said step of determining said purchase incentive comprises determining said purchase incentive on a basis of demographic data stored in said personal page database.

35. The computer program product of claim 27, wherein said step of determining purchase incentive comprises determining said purchase incentive on a basis a frequency of usage of purchase incentives by a consumer.

36. The computer program product of claim 27, wherein said step of determining said purchase incentive comprises determining said purchase incentive on a basis a frequency of usage of said personal web page by a consumer.

37. The computer program product of claim 27, wherein said computer network comprises one of an intranet and the Internet.

38. A computer program product according to claim 27, wherein said step of assigning a web page address comprises assigning a web page address based upon said identity code.

39. A computer program product according to claim 27 performing the further step of transmitting data defining said personal web page to said personal computer.

40. A computer implemented method for generating a web page said method comprising the steps of:

transmitting a prompt for personal information from a main computer to a personal computer over a computer network;

transmitting personal information data from said personal computer to said main computer over said computer network in response to said prompt;

generating page data defining a web page based upon said personal information data;

assigning a web pate address to said web page based upon said personal information data;

storing in a purchase history database data identifying products purchased in association with said identity code;

determining a purchase incentive depending on said data stored in said purchase history database in association with said identity code; and changing said page data so that said web page having said web page address displays said purchase incentive.

41. A computer implemented method for generating a web page, said method comprising the steps of:

transmitting a prompt for personal information from a main computer to a personal computer over a computer network;

transmitting personal information data from said personal computer to said main computer over said computer network in response to said prompt;

generating page data defining a web page based upon said personal information data;

assigning a web page address to said web pane based upon said personal information data;

determining a purchase incentive depending on said personal information; and changing said page data so that said web page having said web page address displays said purchase incentive.

* * * * *

UNITED STATES PATENT AND TRADEMARK OFFICE
CERTIFICATE OF CORRECTION

PATENT NO. : 6,014,634
DATED : Jan. 11, 2000
INVENTOR(S): Scroggie et al.

It is certified that an error appears in the above-identified patent and that said Letters Patent is hereby corrected as shown below:

Column 20, Line 26, In Claims, change "pate" to --page--

Column 20, Line 47, In Claims, change "pane" to --page--

Signed and Sealed this

Twenty-seventh Day of March, 2001

Attest:

NICHOLAS P. GODICI

Attesting Officer

*Acting Director of the United States Patent and Trademark Office*

(12) EX PARTE REEXAMINATION CERTIFICATE (7145th)
United States Patent
Scroggie et al.

(10) Number: US 6,014,634 C1
(45) Certificate Issued: Nov. 10, 2009

(54) SYSTEM AND METHOD FOR PROVIDING SHOPPING AIDS AND INCENTIVES TO CUSTOMERS THROUGH A COMPUTER NETWORK

(75) Inventors: Michael C. Scroggie, Laguna Niguel, CA (US); Michael E. Kacaba, Santa Monica, CA (US); David A. Rochon, Darien, CT (US); David M. Diamond, Pawling, NY (US)

(73) Assignee: Supermarkets Online, Inc., Greenwich, CT (US)

Reexamination Request:
  No. 90/005,888, Dec. 12, 2000

Reexamination Certificate for:
  Patent No.: 6,014,634
  Issued: Jan. 11, 2000
  Appl. No.: 08/905,501
  Filed: Aug. 4, 1997

Certificate of Correction issued Mar. 27, 2001.

Related U.S. Application Data

(63) Continuation of application No. PCT/US96/20497, filed on Dec. 23, 1996.
(60) Provisional application No. 60/009,244, filed on Dec. 26, 1995.
(51) Int. Cl.
  *G06Q 30/00* (2006.01)
  *G07G 1/14* (2006.01)
(52) U.S. Cl. .................... 705/14; 705/26; 705/27
(58) Field of Classification Search .............. 705/14
  See application file for complete search history.

(56) References Cited

U.S. PATENT DOCUMENTS 3,426,326 A    2/1969   Goldstein (Continued)

FOREIGN PATENT DOCUMENTS

EP          0 512 509 A2   11/1992

(Continued)

OTHER PUBLICATIONS

Nikkei Multimedia for Business (Sep. 1998) No. 38, pp. 66–71.

(Continued)

*Primary Examiner*—Andres Kashnikow

(57) ABSTRACT

A system and method for delivering purchasing incentives and a variety of other retail shopping aids through a computer network, such as by E-mail over the Internet or the World Wide Web. Customers (10) of retail stores can establish a bidirectional communication link with the system, log in (16) to the system, and then elect to browse among available purchasing incentive offers (18, 22), or elect to explore other shopping aids, such as a shopping list generator (26), a recipe center (30), or simply elect to claim a product rebate or to receive product information. If the customer elects to have product informaton or rebate information delivered, only minimal customer identification is required. For purchase incentives redeemable at retail stores, the customer must provide identification information and must also designate a retailer (12) at which the purchasing incentive can be exercised. For receipt of focused incentives based the customer's past shopping behavior, the customer must also supply a unique customer id., such as a check cashing card number or credit card number, used for in-store purchases. For delivery of a product sample, the customer's name and address must be supplied. The system merges this customer-supplied information (270) with other purchase incentive data (272) and creates a printable graphical image of the purchasing incentive (282) for transmission to the customer. In an alternate embodiment of the invention, the purchase incentive is not transmitted directly to the customer. Instead, the terms of the incentive are transmitted electronically to the retail store (310) designated by the customer, who receives either a token (316) to present at the store or an advisory message. In yet another embodiment of the invention, incentives may be targeted to specific consumers based on a consumer purchase history (502), and transmitted to consumers' computers (510) using electronic mail addresses stored in a consumer database (506), or using a "personal page" in the computer network, established for each consenting consumer.

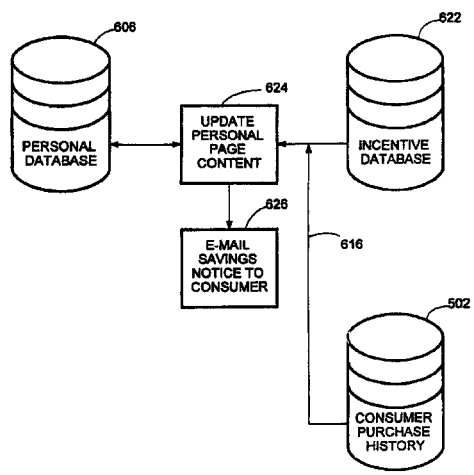

U.S. PATENT DOCUMENTS

| | | | |
|---|---|---|---|
| 3,737,631 A | 6/1973 | Harris | |
| 3,770,941 A | 11/1973 | Gechele et al. | |
| 3,771,132 A | 11/1973 | Biewer | |
| 3,899,775 A | 8/1975 | Larsen | |
| 3,959,624 A | 5/1976 | Kaslow | |
| 4,002,886 A | 1/1977 | Sundelin | |
| 4,419,573 A | 12/1983 | von Geldern | |
| 4,554,446 A | 11/1985 | Murphy et al. | |
| 4,567,359 A | 1/1986 | Lockwood | |
| 4,669,730 A | 6/1987 | Small | |
| 4,672,377 A | 6/1987 | Murphy et al. | 340/825.34 |
| 4,673,802 A | 6/1987 | Ohmae et al. | 235/379 |
| 4,674,041 A | 6/1987 | Lemon et al. | |
| 4,703,423 A | 10/1987 | Bado et al. | |
| 4,723,212 A | 2/1988 | Mindrum et al. | |
| 4,747,050 A | 5/1988 | Brachtl et al. | 364/408 |
| 4,752,675 A | 6/1988 | Zetmeir | |
| 4,787,037 A | 11/1988 | Ootsuka | |
| 4,791,281 A | 12/1988 | Johnsen et al. | |
| 4,833,308 A | 5/1989 | Humble | |
| 4,843,546 A | 6/1989 | Yoshida et al. | |
| 4,855,908 A | 8/1989 | Shimoda et al. | 364/405 |
| 4,862,350 A | 8/1989 | Orr et al. | 364/200 |
| 4,876,592 A | 10/1989 | Von Kohorn | |
| 4,882,675 A | 11/1989 | Nichtberger et al. | |
| 4,887,208 A | 12/1989 | Schneider et al. | |
| 4,908,761 A | 3/1990 | Tai | |
| 4,937,742 A | 6/1990 | Marshall | |
| 4,949,256 A | 8/1990 | Humble | |
| 4,972,504 A | 11/1990 | Daniel, Jr. et al. | |
| 4,982,346 A | 1/1991 | Girouard et al. | |
| 5,025,372 A | 6/1991 | Burton et al. | 364/406 |
| 5,034,807 A | 7/1991 | Von Kohorn | |
| 5,056,019 A | 10/1991 | Schultz et al. | |
| 5,060,185 A | 10/1991 | Naito et al. | |
| 5,093,718 A | 3/1992 | Hoarty et al. | |
| 5,117,355 A | 5/1992 | McCarthy | |
| 5,119,294 A | 6/1992 | Tanaka | |
| 5,128,752 A | 7/1992 | Von Kohorn | |
| 5,128,861 A | 7/1992 | Kagami et al. | |
| 5,168,445 A | 12/1992 | Kawashima et al. | |
| 5,173,851 A | 12/1992 | Off et al. | |
| 5,176,224 A | 1/1993 | Spector | |
| 5,185,695 A | 2/1993 | Pruchnicki | |
| 5,192,854 A | 3/1993 | Counts | |
| 5,193,056 A | 3/1993 | Boes | |
| 5,198,644 A | 3/1993 | Pfeiffer et al. | |
| 5,202,826 A | 4/1993 | McCarthy | |
| 5,208,742 A | 5/1993 | Warn | 364/131 |
| 5,227,874 A | 7/1993 | Von Kohorn | |
| 5,237,496 A | 8/1993 | Kagami et al. | |
| 5,237,499 A | 8/1993 | Garback | |
| 5,245,533 A | 9/1993 | Marshall | |
| 5,249,044 A | 9/1993 | Von Kohorn | |
| 5,253,345 A | 10/1993 | Fernandes et al. | 395/275 |
| 5,256,863 A | 10/1993 | Ferguson et al. | |
| 5,260,778 A | 11/1993 | Kauffman et al. | |
| 5,285,278 A | 2/1994 | Holman | |
| 5,287,181 A | 2/1994 | Holman | |
| 5,287,268 A | 2/1994 | McCarthy | |
| 5,297,026 A | 3/1994 | Hoffman | 364/408 |
| 5,305,195 A | 4/1994 | Murphy | |
| 5,305,197 A | 4/1994 | Axler et al. | |
| 5,305,199 A | 4/1994 | LoBiondo et al. | |
| 5,310,997 A | 5/1994 | Roach et al. | |
| 5,315,093 A | 5/1994 | Stewart | |
| 5,331,544 A | 7/1994 | Lu et al. | |
| 5,337,253 A | 8/1994 | Berkovsky et al. | |
| 5,347,632 A | 9/1994 | Filepp et al. | |
| 5,353,218 A | 10/1994 | De Lapa et al. | |
| 5,367,452 A | 11/1994 | Gallery et al. | |
| 5,368,129 A | 11/1994 | Von Kohorn | |
| 5,377,095 A | 12/1994 | Maeda et al. | |
| 5,380,991 A | 1/1995 | Valencia et al. | |
| 5,388,165 A | 2/1995 | Deaton et al. | |
| 5,396,417 A | 3/1995 | Burks et al. | |
| 5,401,946 A | 3/1995 | Weinblatt | |
| RE34,915 E | 4/1995 | Nichtberger et al. | |
| 5,406,475 A | 4/1995 | Kouchi et al. | |
| 5,420,606 A | 5/1995 | Begum et al. | |
| 5,430,644 A | 7/1995 | Deaton et al. | |
| 5,446,919 A | 8/1995 | Wilkins | |
| 5,448,471 A | 9/1995 | Deaton et al. | |
| 5,459,306 A | 10/1995 | Stein et al. | |
| 5,483,049 A | 1/1996 | Schulze, Jr. | |
| 5,490,060 A | 2/1996 | Malec et al. | |
| 5,491,838 A | 2/1996 | Takahisa et al. | |
| 5,502,636 A | 3/1996 | Clarke | |
| 5,504,519 A | 4/1996 | Remillard | |
| 5,504,675 A | 4/1996 | Cragun et al. | |
| 5,508,731 A | 4/1996 | Kohorn | |
| 5,513,102 A | 4/1996 | Auriemma | 364/408 |
| 5,515,098 A | 5/1996 | Carles | |
| 5,515,270 A | 5/1996 | Weinblatt | 364/405 |
| 5,537,314 A | 7/1996 | Kanter | 364/406 |
| 5,557,518 A | 9/1996 | Rosen | |
| 5,557,721 A | 9/1996 | Fite et al. | |
| 5,564,073 A | 10/1996 | Takahisa | |
| 5,572,643 A | 11/1996 | Judson | |
| 5,577,266 A | 11/1996 | Takahisa et al. | |
| 5,579,537 A | 11/1996 | Takahisa | |
| 5,584,025 A | 12/1996 | Keithley et al. | |
| 5,592,378 A | 1/1997 | Cameron et al. | |
| 5,592,560 A | 1/1997 | Deaton et al. | |
| 5,594,493 A | 1/1997 | Nemirofsky | |
| 5,604,542 A | 2/1997 | Dedrick | |
| 5,612,527 A | 3/1997 | Ovadia | |
| 5,612,730 A | 3/1997 | Lewis | |
| 5,612,868 A | 3/1997 | Off et al. | |
| 5,621,812 A | 4/1997 | Deaton et al. | |
| 5,636,346 A | 6/1997 | Saxe | |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,661,517 A | 8/1997 | Budow et al. | |
| 5,664,110 A | 9/1997 | Green et al. | |
| 5,675,662 A | 10/1997 | Deaton et al. | |
| 5,679,938 A | 10/1997 | Templeton et al. | |
| 5,679,940 A | 10/1997 | Templeton et al. | |
| 5,687,322 A | 11/1997 | Deaton et al. | |
| 5,689,100 A | 11/1997 | Carrithers et al. | |
| 5,697,844 A | 12/1997 | Von Kohorn | |
| 5,701,252 A | 12/1997 | Facchin et al. | |
| 5,701,451 A | 12/1997 | Rogers et al. | |
| 5,706,507 A | 1/1998 | Schloss | |
| 5,708,782 A | 1/1998 | Larson et al. | |
| 5,712,979 A | 1/1998 | Graber et al. | |
| 5,715,399 A | 2/1998 | Bezos | |
| 5,717,860 A | 2/1998 | Graber et al. | |
| 5,721,908 A | 2/1998 | Largarde et al. | |
| 5,724,521 A * | 3/1998 | Dedrick | 705/26 |
| 5,734,823 A | 3/1998 | Saigh et al. | |
| 5,734,838 A | 3/1998 | Robinson et al. | |
| 5,740,549 A | 4/1998 | Reilly et al. | |
| 5,752,246 A | 5/1998 | Rogers et al. | |
| 5,754,938 A | 5/1998 | Herz et al. | |
| 5,754,939 A | 5/1998 | Herz et al. | |
| 5,758,257 A | 5/1998 | Herz et al. | |

| | | | |
|---|---|---|---|
| 5,758,328 A | 5/1998 | Giovannoli | |
| 5,759,101 A | 6/1998 | Von Kohorn | |
| 5,761,648 A | 6/1998 | Golden et al. | |
| 5,774,868 A | 6/1998 | Cragun et al. | |
| 5,774,870 A | 6/1998 | Storey | |
| 5,791,991 A | 8/1998 | Small | |
| 5,794,207 A | 8/1998 | Walker et al. | |
| 5,794,210 A * | 8/1998 | Goldhaber et al. | 705/14 |
| 5,802,497 A | 9/1998 | Manasse | |
| 5,806,044 A | 9/1998 | Powell | |
| 5,806,045 A | 9/1998 | Biorge et al. | 705/14 |
| 5,809,242 A | 9/1998 | Shaw et al. | |
| 5,812,668 A | 9/1998 | Weber | |
| 5,812,769 A | 9/1998 | Graber et al. | |
| 5,812,776 A * | 9/1998 | Gifford | 709/217 |
| 5,815,657 A | 9/1998 | Williams et al. | |
| 5,822,735 A | 10/1998 | De Lapa et al. | |
| 5,826,244 A | 10/1998 | Huberman | |
| 5,832,457 A | 11/1998 | O'Brien et al. | |
| 5,832,458 A | 11/1998 | Jones | |
| 5,832,459 A | 11/1998 | Cameron et al. | |
| 5,838,790 A | 11/1998 | McAuliffe et al. | |
| 5,839,117 A | 11/1998 | Cameron et al. | |
| 5,845,259 A | 12/1998 | West et al. | |
| 5,848,396 A | 12/1998 | Gerace | |
| 5,850,446 A | 12/1998 | Berger et al. | |
| 5,855,007 A | 12/1998 | Jovicic et al. | |
| 5,855,008 A | 12/1998 | Goldhaber et al. | |
| 5,857,175 A | 1/1999 | Day et al. | |
| 5,859,414 A | 1/1999 | Grimes et al. | 235/383 |
| 5,864,825 A | 1/1999 | Kobayashi et al. | 705/24 |
| RE36,116 E | 2/1999 | McCarthy | |
| 5,870,723 A | 2/1999 | Paer, Jr. et al. | |
| 5,878,222 A | 3/1999 | Harrison | |
| 5,884,278 A | 3/1999 | Powell | |
| 5,884,309 A * | 3/1999 | Vanechanos, Jr. | 707/10 |
| 5,887,271 A | 3/1999 | Powell | |
| 5,889,863 A | 3/1999 | Weber | |
| 5,890,137 A | 3/1999 | Koreeda | |
| 5,892,827 A | 4/1999 | Beach et al. | |
| 5,901,287 A | 5/1999 | Bull et al. | |
| 5,903,874 A | 5/1999 | Leonard et al. | |
| 5,905,246 A | 5/1999 | Fajkowski | |
| 5,907,830 A | 5/1999 | Engel | |
| 5,907,831 A | 5/1999 | Lotvin et al. | |
| 5,909,023 A | 6/1999 | Ono et al. | |
| 5,909,673 A | 6/1999 | Gregory | |
| 5,914,712 A * | 6/1999 | Sartain et al. | 725/9 |
| 5,915,243 A | 6/1999 | Smolen | |
| 5,916,024 A | 6/1999 | Von Kohorn | |
| 5,918,014 A | 6/1999 | Robinson | |
| 5,918,211 A | 6/1999 | Sloane | |
| 5,918,213 A | 6/1999 | Bernard et al. | |
| 5,923,016 A | 7/1999 | Fredregill et al. | |
| 5,923,552 A | 7/1999 | Brown et al. | |
| 5,924,080 A | 7/1999 | Johnson | |
| 5,926,795 A | 7/1999 | Williams | |
| 5,931,917 A | 8/1999 | Nguyen | |
| 5,933,811 A | 8/1999 | Angles | |
| 5,943,424 A | 8/1999 | Berger et al. | |
| 5,948,040 A | 9/1999 | DeLorme et al. | |
| 5,948,061 A | 9/1999 | Merriman et al. | |
| 5,950,173 A | 9/1999 | Perkowski | |
| 5,956,027 A | 9/1999 | Krishnamurthy | |
| 5,963,924 A | 10/1999 | Williams et al. | |
| 5,970,469 A * | 10/1999 | Scroggie et al. | 705/14 |
| 5,970,472 A | 10/1999 | Allsop et al. | |
| 5,974,396 A | 10/1999 | Anderson et al. | |
| 5,974,399 A | 10/1999 | Giuliani et al. | |
| 5,978,013 A | 11/1999 | Jones et al. | |
| 5,978,840 A | 11/1999 | Nguyen et al. | |
| 5,979,757 A | 11/1999 | Tracy et al. | |
| 5,982,891 A | 11/1999 | Ginter et al. | |
| 5,982,892 A | 11/1999 | Hicks et al. | 380/4 |
| 5,983,196 A | 11/1999 | Wendkos | |
| 5,983,208 A | 11/1999 | Haller et al. | |
| 5,987,132 A | 11/1999 | Rowney | |
| 5,987,504 A | 11/1999 | Toga | |
| 5,991,735 A * | 11/1999 | Gerace | 705/10 |
| 5,992,888 A | 11/1999 | North et al. | |
| 5,995,015 A | 11/1999 | DeTemple et al. | |
| 5,995,942 A | 11/1999 | Smith et al. | |
| 5,996,076 A | 11/1999 | Rowney et al. | |
| 5,999,912 A | 12/1999 | Wodarz et al. | |
| 5,999,914 A | 12/1999 | Blinn et al. | |
| 6,002,394 A | 12/1999 | Schein et al. | |
| 6,002,767 A | 12/1999 | Kramer | |
| 6,002,771 A | 12/1999 | Nielsen | |
| 6,006,197 A | 12/1999 | D'Eon | |
| 6,009,410 A | 12/1999 | LeMole et al. | |
| 6,009,411 A | 12/1999 | Kepecs | |
| 6,012,038 A | 1/2000 | Powell | |
| 6,012,039 A | 1/2000 | Hoffman et al. | |
| 6,014,634 A | 1/2000 | Scroggie | |
| 6,021,362 A | 2/2000 | Maggard et al. | |
| 6,026,368 A | 2/2000 | Brown et al. | |
| 6,026,369 A | 2/2000 | Capek | |
| 6,026,370 A | 2/2000 | Jermyn | |
| 6,029,142 A | 2/2000 | Hill | |
| 6,039,244 A | 3/2000 | Finsterwald | |
| 6,041,308 A | 3/2000 | Walker et al. | |
| 6,041,309 A | 3/2000 | Laor | |
| 6,047,263 A | 4/2000 | Goodwin, III | |
| 6,049,778 A | 4/2000 | Walker et al. | |
| 6,055,513 A | 4/2000 | Katz et al. | |
| 6,055,573 A * | 4/2000 | Gardenswartz et al. | 709/224 |
| 6,061,660 A | 5/2000 | Eggleston et al. | |
| 6,073,105 A | 6/2000 | Sutcliffe et al. | |
| 6,075,971 A | 6/2000 | Williams et al. | |
| 6,076,068 A | 6/2000 | DeLapa et al. | |
| 6,076,069 A | 6/2000 | Laor | |
| 6,105,002 A | 8/2000 | Powell | 705/14 |
| 6,141,010 A | 10/2000 | Hoyle | |
| 6,185,541 B1 | 2/2001 | Scroggie | |
| 6,230,143 B1 | 5/2001 | Simons et al. | |
| 6,237,145 B1 | 5/2001 | Narasimhan et al. | |
| 6,266,649 B1 | 7/2001 | Linden et al. | |
| 6,321,208 B1 * | 11/2001 | Barnett et al. | 705/14 |
| 6,330,543 B1 | 12/2001 | Kepecs | |
| 6,336,099 B1 | 1/2002 | Barnett et al. | |

FOREIGN PATENT DOCUMENTS

| | | |
|---|---|---|
| EP | 0512509 B1 | 11/1992 |
| EP | 0822535 A2 | 9/1998 |
| JP | 07-181891 | 7/1995 |
| WO | WO 92/20030 | 11/1992 |
| WO | WO 93/15466 | 8/1993 |
| WO | WO 95/16971 | 6/1995 |
| WO | WO 97/23838 | 7/1997 |
| WO | WO 97/30409 | 8/1997 |
| WO | WO 97/31322 | 8/1997 |

OTHER PUBLICATIONS

Nikkei Multimedia for Business (Mar. 1998) No. 32, pp. 118–123.

Nikkei PC21, vol. 3, No. 10, pp. 228–231, Nikkei PB, 1998.

Wilbert, Tony "Now Shoppers Can Clip Coupons Off the Internet" Atlanta Business Chronicle.

Email from Mike Kacaba Regarding Phase One Requirements Document Version 1.0, dated Sep. 19, 1995 and Draft Requirements Document Attached to that Email.

Cern httpd Reference Manual, *A Guide To A World–Wide Web HyperText Daemon* (Apr. 1994).

*How To Set Up A World Wide Web Site, The Guide for Information Providers*, Lincoln D. Stein (1995).

Plaintiff's Exhibit # 63, Notice of Subpoena Duces Tecum, Case No. CIV 00–01714 RSWL (JWJx).

Deposition Exhibit # 6, Notice of Deposition of Coolsavings.com, Inc. Pursuant to F.R.C.P. 30(b)(6), Case No. CV 00–01714 RSWL (JWJx).

Deposition Exhibit # 2, Notice of Deposition of Coolsavings.Com, Inc. Pursuant to F.R.C.P. 30(b)(6), Case No. CV 00–01714 RSWL (JWJx).

Order Staying Proceedings Pending Reexamination, Case No. CV 00–01714 (JWJx).

Complaint For Patent Infringement—35 U.S.C. §§ 271, 281, 283, 284 and 285, CV 00–01714.

Coolsavings' Answer and Counterclaim to Complaint, Case No. 00–01714 RSWL.

Supermarkets Online's Reply to Counterclaim, Case No. 00–01714 RSWL.

Coolsavings' Suplemental Answers and Objections to Supermarkets Online, Inc.'s Interrogatories Nos. 1–5, Case No. 00–01714 (JWJx).

Coolsavings' Supplemental Responses and Objections Supermarkets Online Inc.'s Second Set of Interrogatories Nos. 6–17, Case No. 00–01714 RSWL (JWJx).

Letter from Russell J. Genet at Jenkins & Gilchrist, to the USPTO dated Oct. 17, 2001.

Egner, "High–Tech Calling at Home Shopping Network," *Florida Business—Tampa Bay*, vol. 5, No. 6, S1, Jun. 1990, p. 20.

\* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–41 are cancelled.

\* \* \* \* \*